(12) United States Patent
Lei et al.

(10) Patent No.: US 12,343,871 B2
(45) Date of Patent: Jul. 1, 2025

(54) ROBOTIC SYSTEM WITH GRIPPING MECHANISM

(71) Applicant: MUJIN, Inc., Tokyo (JP)

(72) Inventors: Lei Lei, Tokyo (JP); Xu Chen, Tokyo (JP); Yixuan Zhang, Tokyo (JP); Pai Zheng, Tokyo (JP); Yufan Du, Tokyo (JP); Hironori Mizoguchi, Tokyo (JP); Shekhar Gupta, Tokyo (JP); Rosen Nikolaev Diankov, Tokyo (JP)

(73) Assignee: Mujin, Inc., Tokyo (JP)

( * ) Notice: Subject to any disclaimer, the term of this patent is extended or adjusted under 35 U.S.C. 154(b) by 423 days.

(21) Appl. No.: 17/506,556

(22) Filed: Oct. 20, 2021

(65) Prior Publication Data

US 2022/0219317 A1 Jul. 14, 2022

Related U.S. Application Data

(60) Provisional application No. 63/136,207, filed on Jan. 12, 2021.

(51) Int. Cl.
*B25J 9/16* (2006.01)
*B25J 15/06* (2006.01)
(Continued)

(52) U.S. Cl.
CPC ............ *B25J 9/1612* (2013.01); *B25J 15/06* (2013.01); *B25J 17/0258* (2013.01); *B65G 67/02* (2013.01)

(58) Field of Classification Search
CPC ...... B25J 9/1612; B25J 15/06; B25J 17/0258; B25J 15/0061; B25J 15/0616; B25J 19/00; B25J 11/00; B65G 67/02; B65G 47/918
(Continued)

(56) References Cited

U.S. PATENT DOCUMENTS 5,201,239 A * 4/1993 Bundo ................. B25J 17/0283
901/29
5,394,604 A * 3/1995 Corsi ....................... B23Q 1/01
29/560
(Continued)

FOREIGN PATENT DOCUMENTS

CN 101484987 A 7/2009
CN 101767095 A 7/2010
(Continued)

OTHER PUBLICATIONS

CNIPA Office Action mailed Jul. 30, 2024 for application No. 202210027580.8, 7 pages.
(Continued)

*Primary Examiner* — David Luo
(74) *Attorney, Agent, or Firm* — Perkins Coie LLP

(57) ABSTRACT

An object gripping assembly and associated systems and methods are disclosed herein. In some embodiments, the object gripping assembly includes a first carrying plate with a first mounting track extending along a first axis and two or more second carrying plates movably carried by the first mounting track. Each of the two or more second carrying plates can include a second mounting track extending along a second axis at least and extendable gripping components movably carried by the second mounting track. A first pitch adjusting component can be operably coupled the two or more second carrying plates to controllably change the pitch of the two or more second carrying plates along the first mounting track. A second pitch adjusting component can be operably coupled to the extendable gripping components on a corresponding second carrying plate to controllably change the pitch of the extendable gripping components along the second mounting track.

13 Claims, 15 Drawing Sheets

(51) Int. Cl.
*B25J 17/02* (2006.01)
*B65G 67/02* (2006.01)

(58) Field of Classification Search
USPC .................. 318/568.11, 568.1, 567, 560
See application file for complete search history.

(56) References Cited

U.S. PATENT DOCUMENTS

| 8,896,254 | B2* | 11/2014 | Kwon | G05B 19/4067 |
| | | | | 318/590 |
| 9,776,334 | B2* | 10/2017 | Vangilbergen | B25J 15/0061 |
| 10,226,865 | B2* | 3/2019 | Nakayama | B25J 9/1669 |
| 2014/0271084 | A1 | 9/2014 | Vangilbergen et al. | |

FOREIGN PATENT DOCUMENTS

| CN | 208882910 U | 5/2019 |
| CN | 209169115 U | 7/2019 |
| CN | 114762983 A | 7/2022 |
| JP | 2001505134 A | 4/2001 |
| JP | 2003066094 A | 3/2003 |
| JP | 2004039706 A | 2/2004 |
| JP | 2006162590 A | 6/2006 |
| JP | 2009542551 A | 12/2009 |
| JP | 2017520417 A | 7/2017 |
| KR | 1020100079945 A | 7/2010 |

OTHER PUBLICATIONS

CNIPA Office Action mailed Jul. 13, 2023 for application No. 202210027580.9, 7 pages.

JPO Decision to Grant mailed Feb. 16, 2022 for application No. 2021205766, 3 pages.

JPO Office Action mailed Jan. 12, 2022 for application No. 2021205766, 7 pages.

* cited by examiner

ROBOTIC SYSTEM WITH GRIPPING MECHANISM

CROSS-REFERENCE TO RELATED APPLICATION(S)

The present application claims the benefit of U.S. Provisional Patent Application No. 63/136,207, filed Jan. 12, 2021, the entirety of which is incorporated herein by reference.

TECHNICAL FIELD

The present technology related generally to robotic systems with gripping mechanisms, and more specifically to robotic systems with gripping mechanisms having a controllable, variable pitch.

BACKGROUND

With their ever-increasing performance and lowering cost, many robots (e.g., machines configured to automatically/autonomously execute physical actions) are now extensively used in many fields. Robots, for example, can be used to execute various tasks (e.g., manipulate or transfer an object through space) in manufacturing and/or assembly, packing and/or packaging, transport and/or shipping, etc. In executing the tasks, the robots can replicate human actions, thereby replacing or reducing human involvements that are otherwise required to perform dangerous or repetitive tasks.

However, despite the technological advancements, robots often lack the sophistication necessary to duplicate human interactions required for executing larger and/or more complex tasks. Accordingly, there remains a need for improved techniques and systems for managing operations and/or interactions between robots.

Figure 1:
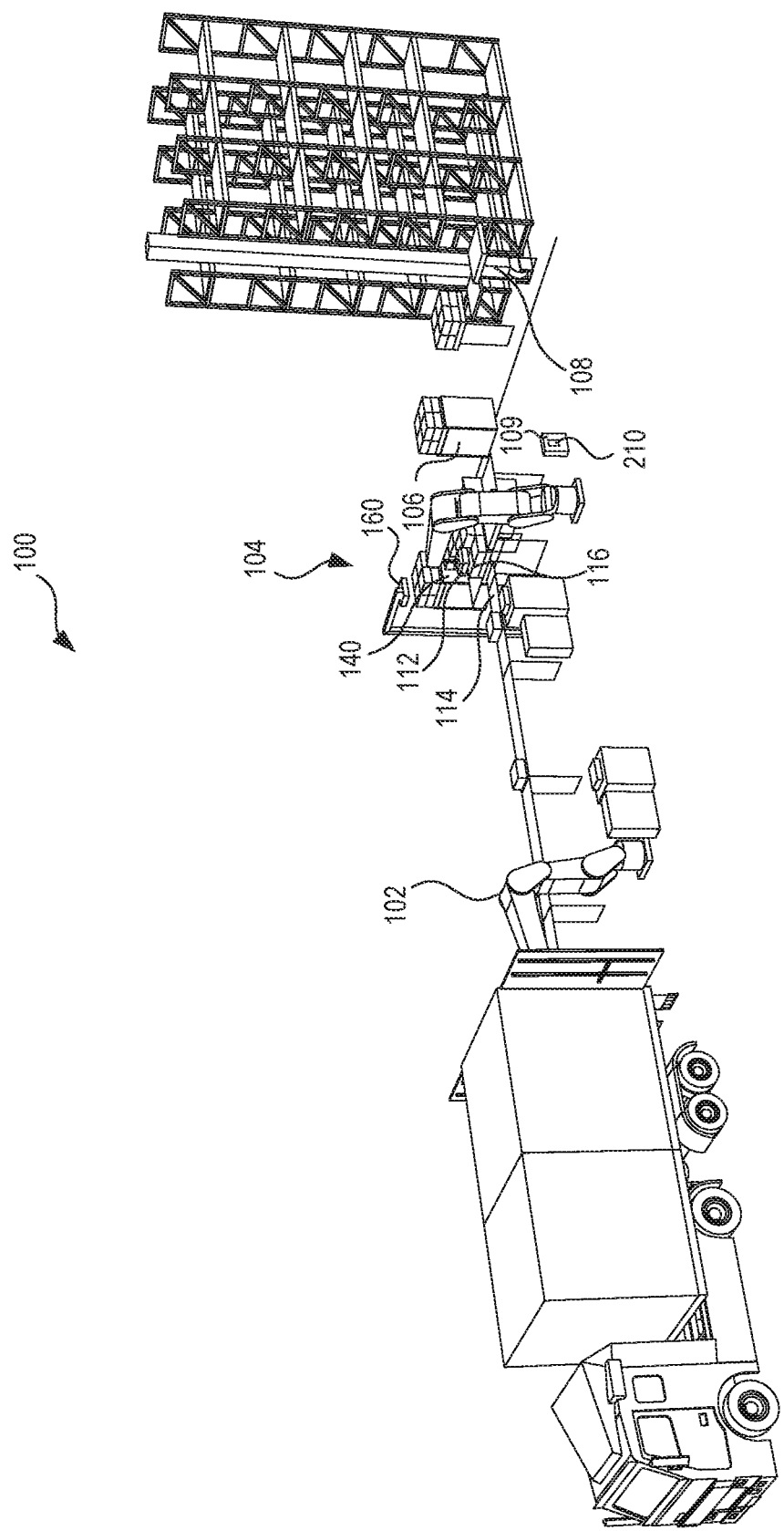
FIG. 1 is an illustration of an example environment in which a robotic system with a gripping mechanism can operate in accordance with some embodiments of the present technology.

The drawings have not necessarily been drawn to scale. Similarly, some components and/or operations can be separated into different blocks or combined into a single block for the purpose of discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

Overview

Object gripping assemblies having a variable pitch, and methods for operating the same, are disclosed herein. In some embodiments, the object gripping assembly includes a first carrying plate with an upper surface and a lower surface. The upper surface can include a flange configured to connect to a robotic arm or other suitable positioning mechanism while the lower surface can include one or more first mounting tracks extending along a first axis (e.g., in an x-direction). The first mounting track(s) can slidably carry a plurality of second carrying plates. Each of the second carrying plates can include one or more second mounting tracks extending along a second axis (e.g., in a y-direction) at least partially orthogonal to the first axis. A plurality of extendable gripping components are slidably carried by the second mounting track(s). The first carrying plate can also carry a first pitch adjustment plate that is operably coupled to the second carrying plates. The position of the first pitch adjustment plate controls the pitch of the second carrying plates in the first axis. Accordingly, movement of the first pitch adjustment plate controllably adjusts the pitch of the plurality of second carrying plates. Additionally, or alternatively, each of the second carrying plates can carry a plurality of second pitch adjustment plates that is operably coupled to the extendable gripping components on the corresponding second carrying plate. The position of the second pitch adjustment plate controls the pitch of the extendable gripping components in the second axis. Accordingly, movement of the second pitch adjustment plate controllably adjusts the pitch of the extendable gripping components.

In some embodiments, the object gripping assembly includes a first expandable component operably coupled between the first pitch adjustment plate and the first carrying plate. As the first expandable component expands (or contracts), the first expandable component adjusts the position of the first pitch adjustment plate with respect to the first carrying plate. Accordingly, the expansion (or contraction) of the first expandable component can controllably adjust the pitch of the second carrying plates along the first axis.

Similarly, in some embodiments, the object gripping assembly includes a plurality of second expandable components operably coupled between a corresponding second pitch adjustment plate and second carrying plate. As the second expandable components expand (or contract), the second expandable components adjust the position of the second pitch adjustment plates with respect to the second carrying plates. Accordingly, the expansion (or contraction) of the second expandable components can controllably adjust the pitch of the extendable gripping components along the second axis. In some such embodiments, each of the second carrying plates includes one or more vertical mounting tracks extending in a vertical axis (e.g., in a z-direction) at least partially orthogonal to both of the first axis and the second axis. The second pitch adjustment plates can be slidably carried by the vertical mounting track(s) on the corresponding second carrying plate at a position set by the second expandable components.

In some embodiments, one or more of the second carrying plates includes one or more stopper components that are operable between an engaged position and a disengaged position. In the engaged position, the stopper components prevent movement of a corresponding second pitch adjustment plate beyond a position predetermined by a location of the stopper component. By preventing movement beyond the predetermined position, the stopper components can set a minimum and/or maximum pitch for the extendable gripping components. In some embodiments, the predetermined position can be adjusted as desired (e.g., before, while, or after engaging the stopper component), allowing the minimum and/or maximum pitch to be readily adjusted. In some embodiments, one or more of the second carrying plates includes two stopper components, allowing a first stopper component to set a maximum pitch for the extendable gripping components and a second stopper to set a minimum pitch.

In various embodiments, each of the extendable gripping components can include a gripping component such as a suction element, a vacuum port, a magnetic component, a pneumatic gripper, a robotic gripper, and/or any other suitable component. In some embodiments, a first subset of the extendable gripping components have a first gripping component (e.g., a suction element) while a second subset of the extendable gripping components have a second gripping component (e.g., a magnetic element). Further, in some embodiments, each of the extendable gripping components is independently extendable and/or actuatable to grip and release objects, allowing any subset of the extendable gripping components to be operated at a given time. As a result, the object gripping assembly can customize the pitch of the extendable gripping components and/or the total number of the extendable gripping components operating at a time.

For ease of reference, the object gripping assembly is sometimes described herein with reference to top and bottom, upper and lower, upwards and downwards, x-y directions, z-direction, horizontal, or vertical plane relative to the spatial orientation of the embodiments shown in the figures. It is to be understood, however, that the object gripping assembly can be moved to, and used in, different spatial orientations without changing the structure and/or function of the disclosed embodiments of the present technology.

Further, several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments can have different configurations or different components than those described in this section. Accordingly, the disclosed techniques can have other embodiments with additional elements or without several of the elements described below.

Many embodiments or aspects of the present disclosure described below can take the form of computer-executable or controller-executable instructions, including routines executed by a programmable computer or controller. Those skilled in the relevant art will appreciate that the disclosed techniques can be practiced on computer or controller systems other than those shown and described below. The techniques described herein can be embodied in a special-purpose computer or data processor that is specifically programmed, configured, or constructed to execute one or more of the computer-executable instructions described below. Accordingly, the terms "computer" and "controller" as generally used herein refer to any data processor and can include Internet appliances and handheld devices, including palm-top computers, wearable computers, cellular or mobile phones, multi-processor systems, processor-based or programmable consumer electronics, network computers, mini computers, and the like. Information handled by these computers and controllers can be presented at any suitable display medium, including a liquid crystal display (LCD). Instructions for executing computer- or controller-executable tasks can be stored in or on any suitable computer-readable medium, including hardware, firmware, or a combination of hardware and firmware. Instructions can be contained in any suitable memory device, including, for example, a flash drive, USB device, and/or other suitable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements co-operate or interact with each other (e.g., as in a cause-and-effect relationship, such as for signal transmission/reception or for function calls), or both.

Example Environment for Robotic System

FIG. 1 is an illustration of an example environment in which a robotic system 100 with an object handling mechanism can operate. The operating environment for the robotic system 100 can includes one or more structures, such as robots or robotic devices, configured to execute one or more tasks. Aspects of the object handling mechanism can be practiced or implemented by the various structures and/or components.

In the example illustrated in FIG. 1, the robotic system 100 can include an unloading unit 102, a transfer unit 104, a transport unit 106, a loading unit 108, or a combination thereof in a warehouse, a distribution center, or a shipping hub. Each of the units in the robotic system 100 can be configured to execute one or more tasks. The tasks can be combined in sequence to perform an operation that achieves a goal, for example, such as to unload objects from a vehicle, such as a truck, trailer, a van, or train car, for storage in a warehouse or to unload objects from storage locations and load them onto a vehicle for shipping. In another example, the task can include moving objects from one location, such as a container, bin, cage, basket, shelf, platform, pallet, or conveyor belt, to another location. Each of the units can be configured to execute a sequence of actions, such as operating one or more components therein, to execute a task.

In some embodiments, the task can include interaction with a target object 112, such as manipulation, moving, reorienting or a combination thereof, of the object. The target object 112 is the object that will be handled by the robotic system 100. More specifically, the target object 112 can be the specific object among many objects that is the target of an operation or task by the robotics system 100. For example, the target object 112 can be the object that the robotic system 100 has selected for or is currently being handled, manipulated, moved, reoriented, or a combination thereof. The target object 112, as examples, can include boxes, cases, tubes, packages, bundles, an assortment of individual items, or any other object that can be handled by the robotic system 100.

As an example, the task can include transferring the target object 112 from an object source 114 to a task location 116. The object source 114 is a receptacle for storage of objects. The object source 114 can include numerous configurations and forms. For example, the object source 114 can be a platform, with or without walls, on which objects can be placed or stacked, such as a pallet, a shelf, or a conveyor belt. As another, the object source 114 can be a partially or fully enclosed receptacle with walls or lid in which objects can be placed, such as a bin, cage, or basket. In some embodiments, the walls of the object source 114 with the partially or fully enclosed can be transparent or can include openings or gaps of various sizes such that portions of the objects contained therein can be visible or partially visible through the walls.

FIG. 1 illustrates examples of the possible functions and operations that can be performed by the various units of the robotic system 100 in handling the target object 112 and it is understood that the environment and conditions can differ from those described hereinafter. For example, the unloading unit 102 can be a vehicle offloading robot configured to transfer the target object 112 from a location in a carrier, such as a truck, to a location on a conveyor belt. Also, the transfer unit 104, such as a palletizing robot, can be configured to transfer the target object 112 from a location on the conveyor belt to a location on the transport unit 106, such as for loading the target object 112 on a pallet on the transport unit 106. In another example, the transfer unit 104 can be a piece-picking robot configured to transfer the target object 112 from one container to another container. In completing the operation, the transport unit 106 can transfer the target object 112 from an area associated with the transfer unit 104 to an area associated with the loading unit 108, and the loading unit 108 can transfer the target object 112, such as by moving the pallet carrying the target object 112, from the transfer unit 104 to a storage location, such as a location on the shelves. Details regarding the task and the associated actions are described below.

For illustrative purposes, the robotic system 100 is described in the context of a shipping center; however, it is understood that the robotic system 100 can be configured to execute tasks in other environments or for other purposes, such as for manufacturing, assembly, packaging, healthcare, or other types of automation. It is also understood that the robotic system 100 can include other units, such as manipulators, service robots, modular robots, that are not shown in FIG. 1. For example, in some embodiments, the robotic system 100 can include a depalletizing unit for transferring the objects from cages, carts, or pallets onto conveyors or other pallets, a container-switching unit for transferring the objects from one container to another, a packaging unit for wrapping the objects, a sorting unit for grouping objects according to one or more characteristics thereof, a piece-picking unit for manipulating the objects differently, such as sorting, grouping, and/or transferring, according to one or more characteristics thereof, or a combination thereof.

The robotic system 100 can include a controller 109 configured to interface with and/or control one or more of the robotic units. For example, the controller 109 can include circuits (e.g., one or more processors, memory, etc.) configured to derive motion plans and/or corresponding commands, settings, and the like used to operate the corresponding robotic unit. The controller 109 can communicate the motion plans, the commands, settings, etc. to the robotic unit, and the robotic unit can execute the communicated plan to accomplish a corresponding task, such as to transfer the target object 112 from the object source 114 to the task location 116.

Suitable System

Figure 2:
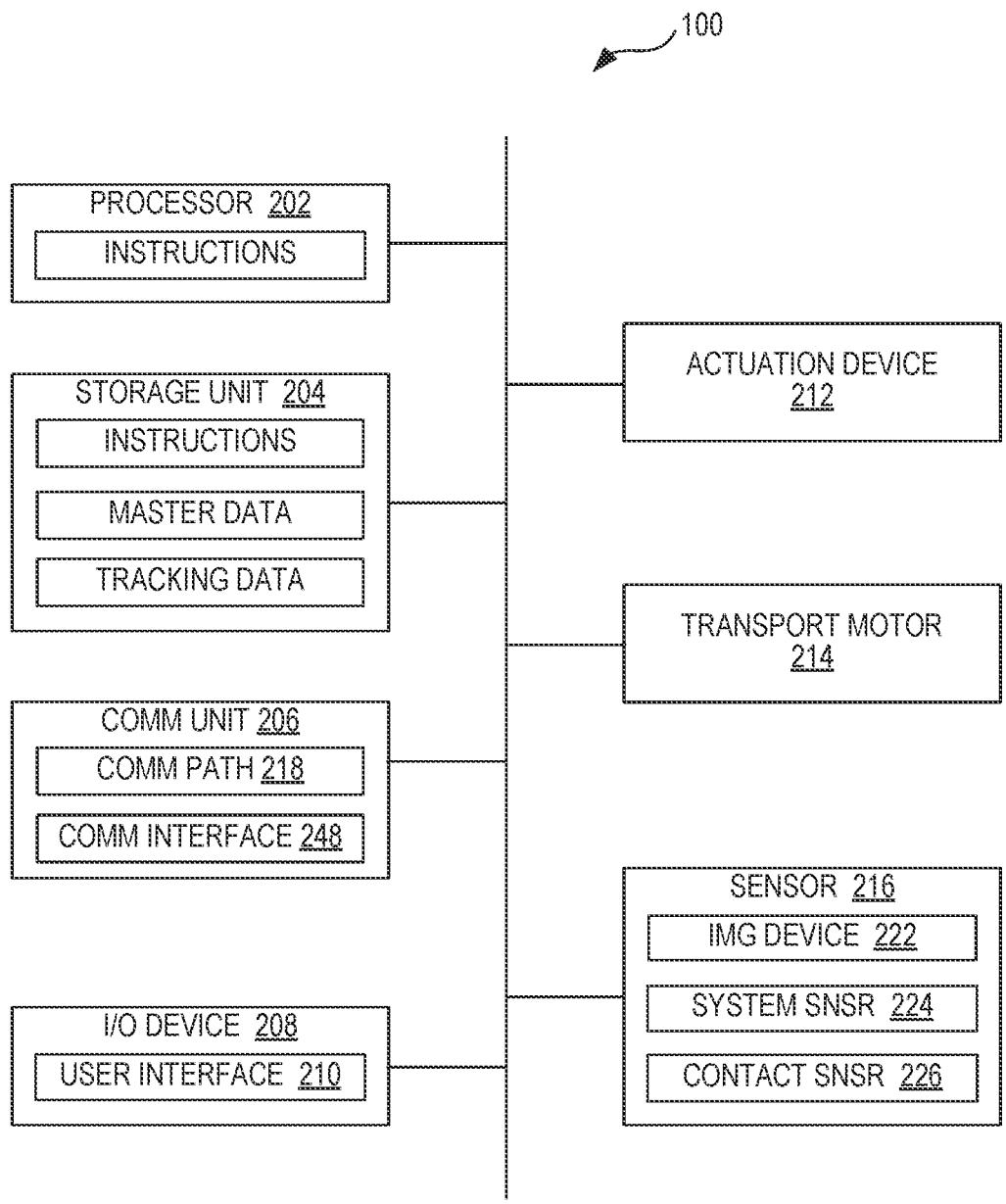
FIG. 2 is a block diagram illustrating the robotic system of FIG. 1 in accordance with some embodiments of the present technology.

FIG. 2 is a block diagram illustrating the robotic system 100 in accordance with one or more embodiments of the present invention. In some embodiments, for example, the robotic system 100 can include electronic devices, electrical devices, or a combination thereof, such as a control unit 202 (sometimes also referred to herein as a "processor 202"), a storage unit 204, a communication unit 206, a system input/output (I/O) device 208 having a system interface 210 (sometimes also referred to herein as a "user interface 210"), one or more actuation devices 212, one or more transport motors 214, one or more sensor units 216, or a combination thereof that are coupled to one another, integrated with or coupled to one or more of the units or robots described in FIG. 1 above, or a combination thereof.

The control unit 202 can be implemented in a number of different ways. For example, the control unit 202 can be a processor, an application specific integrated circuit (ASIC), an embedded processor, a microprocessor, a hardware control logic, a hardware finite state machine (FSM), a digital signal processor (DSP), or a combination thereof. The control unit 202 can execute software and/or instructions to provide the intelligence of the robotic system 100.

The control unit 202 can be operably coupled to the user interface 210 to provide a user with control over the control unit 202. The user interface 210 can be used for communication between the control unit 202 and other functional units in the robotic system 100. The user interface 210 can also be used for communication that is external to the robotic system 100. The user interface 210 can receive information from the other functional units or from external sources, or can transmit information to the other functional units or to external destinations. The external sources and the external destinations refer to sources and destinations external to the robotic system 100.

The user interface 210 can be implemented in different ways and can include different implementations depending on which functional units or external units are being interfaced with the user interface 210. For example, the user interface 210 can be implemented with a pressure sensor, an inertial sensor, a microelectromechanical system (MEMS), optical circuitry, waveguides, wireless circuitry, wireline circuitry, application programming interface, or a combination thereof.

The storage unit 204 can store the software instructions, master data, tracking data or a combination thereof. For illustrative purposes, the storage unit 204 is shown as a single element, although it is understood that the storage unit 204 can be a distribution of storage elements. Also for illustrative purposes, the robotic system 100 is shown with the storage unit 204 as a single hierarchy storage system, although it is understood that the robotic system 100 can have the storage unit 204 in a different configuration. For example, the storage unit 204 can be formed with different storage technologies forming a memory hierarchal system including different levels of caching, main memory, rotating media, or off-line storage.

The storage unit 204 can be a volatile memory, a non-volatile memory, an internal memory, an external memory, or a combination thereof. For example, the storage unit 204 can be a nonvolatile storage such as non-volatile random access memory (NVRAM), Flash memory, disk storage, or a volatile storage such as static random access memory (SRAM). As a further example, storage unit 204 can be a non-transitory computer medium including the non-volatile memory, such as a hard disk drive, NVRAM, solid-state storage device (SSD), compact disk (CD), digital video disk (DVD), or universal serial bus (USB) flash memory devices. The software can be stored on the non-transitory computer readable medium to be executed by a control unit 202.

The storage unit 204 can be operably coupled to the user interface 210. The user interface 210 can be used for communication between the storage unit 204 and other functional units in the robotic system 100. The user interface 210 can also be used for communication that is external to the robotic system 100. The user interface 210 can receive information from the other functional units or from external sources, or can transmit information to the other functional units or to external destinations. The external sources and the external destinations refer to sources and destinations external to the robotic system 100.

Similar to the discussion above, the user interface 210 can include different implementations depending on which functional units or external units are being interfaced with the storage unit 204. The user interface 210 can be implemented with technologies and techniques similar to the implementation of the user interface 210 discussed above.

In some embodiments, the storage unit 204 is used to further store and provide access to processing results, predetermined data, thresholds, or a combination thereof. For example, the storage unit 204 can store the master data that includes descriptions of the one or more target objects 112 (e.g., boxes, box types, cases, case types, products, and/or a combination thereof). In one embodiment, the master data includes dimensions, predetermined shapes, templates for potential poses and/or computer-generated models for recognizing different poses, a color scheme, an image, identification information (e.g., bar codes, quick response (QR) codes, logos, and the like), expected locations, an expected weight, and/or a combination thereof, for the one or more target objects 112 expected to be manipulated by the robotic system 100.

In some embodiments, the master data includes manipulation-related information regarding the one or more objects that can be encountered or handled by the robotic system 100. For example, the manipulation-related information for the objects can include a center-of-mass location on each of the objects, expected sensor measurements (e.g., for force, torque, pressure, and/or contact measurements), corresponding to one or more actions, maneuvers, or a combination thereof.

The communication unit 206 can enable external communication to and from the robotic system 100. For example, the communication unit 206 can enable the robotic system 100 to communicate with other robotic systems or units, external devices, such as an external computer, an external database, an external machine, an external peripheral device, or a combination thereof, through a communication path 218, such as a wired or wireless network.

The communication path 218 can span and represent a variety of networks and network topologies. For example, the communication path 218 can include wireless communication, wired communication, optical communication, ultrasonic communication, or the combination thereof. For example, satellite communication, cellular communication, Bluetooth, Infrared Data Association standard (IrDA), wireless fidelity (WiFi), and worldwide interoperability for microwave access (WiMAX) are examples of wireless communication that can be included in the communication path 218. Cable, Ethernet, digital subscriber line (DSL), fiber optic lines, fiber to the home (FTTH), and plain old telephone service (POTS) are examples of wired communication that can be included in the communication path 218. Further, the communication path 218 can traverse a number of network topologies and distances. For example, the communication path 218 can include direct connection, personal area network (PAN), local area network (LAN), metropolitan area network (MAN), wide area network (WAN), or a combination thereof. The robotic system 100 can transmit information between the various units through the communication path 218. For example, the information can be transmitted between the control unit 202, the storage unit 204, the communication unit 206, the I/O device 208, the actuation devices 212, the transport motors 214, the sensor units 216, or a combination thereof.

The communication unit 206 can also function as a communication hub allowing the robotic system 100 to function as part of the communication path 218 and not limited to be an end point or terminal unit to the communication path 218. The communication unit 206 can include active and passive components, such as microelectronics or an antenna, for interaction with the communication path 218.

The communication unit 206 can include a communication interface 248. The communication interface 248 can be used for communication between the communication unit 206 and other functional units in the robotic system 100. The communication interface 248 can receive information from the other functional units or from external sources, or can transmit information to the other functional units or to external destinations. The external sources and the external destinations refer to sources and destinations external to the robotic system 100.

The communication interface 248 can include different implementations depending on which functional units are being interfaced with the communication unit 206. The communication interface 248 can be implemented with technologies and techniques similar to the implementation of the control interface 240.

The I/O device 208 can include one or more input sub-devices and/or one or more output sub-devices. Examples of the input devices of the I/O device 208 can include a keypad, a touchpad, soft-keys, a keyboard, a microphone, sensors for receiving remote signals, a camera for receiving motion commands, or any combination thereof to provide data and communication inputs. Examples of the output device can include a display interface. The display interface can be any graphical user interface such as a display, a projector, a video screen, and/or any combination thereof.

The control unit 202 can operate the I/O device 208 to present or receive information generated by the robotic system 100. The control unit 202 can operate the I/O device 208 to present information generated by the robotic system 100. The control unit 202 can also execute the software and/or instructions for the other functions of the robotic system 100. The control unit 202 can further execute the software and/or instructions for interaction with the communication path 218 via the communication unit 206.

The robotic system 100 can include physical or structural members, such as robotic manipulator arms, that are connected at joints for motion, such as rotational displacement, translational displacements, or a combination thereof. The structural members and the joints can form a kinetic chain configured to manipulate an end-effector, such as a gripping element, to execute one or more task, such as gripping, spinning, or welding, depending on the use or operation of the robotic system 100. The robotic system 100 can include the actuation devices 212, such as motors, actuators, wires, artificial muscles, electroactive polymers, or a combination thereof, configured to drive, manipulate, displace, reorient, or a combination thereof, the structural members about or at a corresponding joint. In some embodiments, the robotic system 100 can include the transport motors 214 configured to transport the corresponding units from place to place.

The robotic system 100 can include the sensor units 216 configured to obtain information used to execute tasks and operations, such as for manipulating the structural members or for transporting the robotic units. The sensor units 216 can include devices configured to detect or measure one or more physical properties of the robotic system 100, such as a state, a condition, a location of one or more structural members or joints, information about objects or surrounding environment, or a combination thereof. As an example, the sensor units 216 can include imaging devices, system sensors, contact sensors, and/or any combination thereof.

In some embodiments, the sensor units 216 include one or more imaging devices 222. The imaging devices 222 are devices configured to detect and image the surrounding environment. For example, the imaging devices 222 can include 2-dimensional cameras, 3-dimensional cameras, both of which can include a combination of visual and infrared capabilities, lidars, radars, other distance-measuring devices, and other imaging devices. The imaging devices 222 can generate a representation of the detected environment, such as a digital image or a point cloud, used for implementing machine/computer vision for automatic inspection, robot guidance, or other robotic applications. As described in further detail below, the robotic system 100 can process the digital image, the point cloud, or a combination thereof via the control unit 202 to identify the target object 112 of FIG. 1, a pose of the target object 112 of, or a combination thereof. For manipulating the target object 112, the robotic system 100 can capture and analyze an image of a designated area, such as inside the truck, inside the container, or a pickup location for objects on the conveyor belt, to identify the target object 112 and the object source 114 of FIG. 1 thereof. Similarly, the robotic system 100 can capture and analyze an image of another designated area, such as a drop location for placing objects on the conveyor belt, a location for placing objects inside the container, or a location on the pallet for stacking purposes, to identify the task location 116 of FIG. 1.

In some embodiments, the sensor units 216 can include system sensors 224. The system sensors 224 can monitor the robotic units within the robotic system 100. For example, the system sensors 224 can include units or devices to detect and monitor positions of structural members, such as the robotic arms and the end-effectors, corresponding joints of robotic units or a combination thereof. As a further example, the robotic system 100 can use the system sensors 224 to track locations, orientations, or a combination thereof of the structural members and the joints during execution of the task. Examples of the system sensors 224 can include accelerometers, gyroscopes, or position encoders.

In some embodiments, the sensor units 216 can include the contact sensors 226, such as pressure sensors, force sensors, strain gauges, piezoresistive/piezoelectric sensors, capacitive sensors, elastoresistive sensors, torque sensors, linear force sensors, other tactile sensors, and/or any other suitable sensors configured to measure a characteristic associated with a direct contact between multiple physical structures or surfaces. For example, the contact sensors 226 can measure the characteristic that corresponds to a grip of the end-effector on the target object 112 or measure the weight of the target object 112. Accordingly, the contact sensors 226 can output a contact measure that represents a quantified measure, such as a measured force or torque, corresponding to a degree of contact or attachment between the gripping element and the target object 112. For example, the contact measure can include one or more force or torque readings associated with forces applied to the target object 112 by the end-effector.

Suitable Object Gripping Assemblies with Variable Pitch Mechanisms

Figure 3:
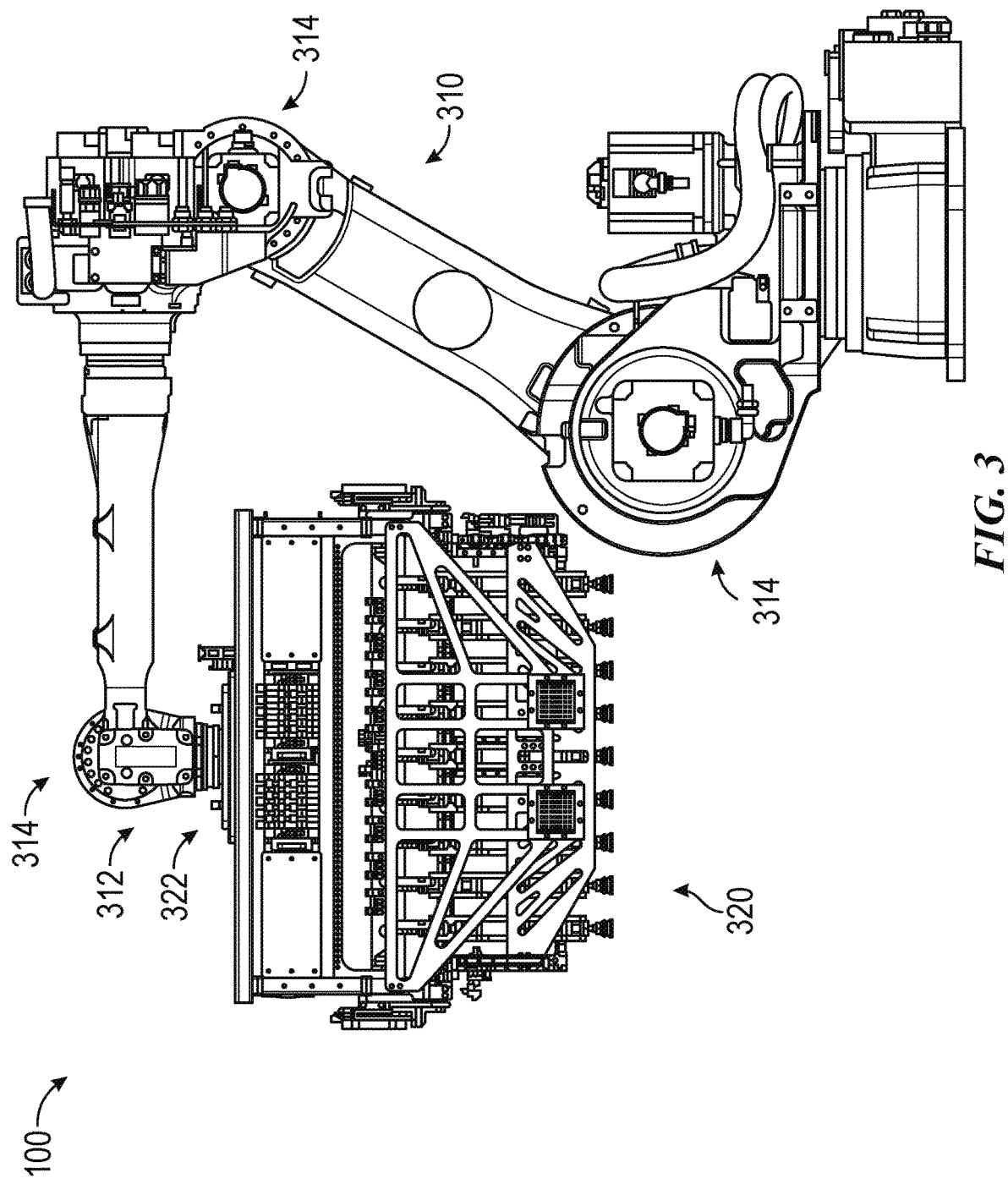
FIG. 3 is a side view of a robotic system having an object gripping assembly with controllable, variable pitch setting mechanisms in accordance with some embodiments of the present technology.

FIG. 3 is a side view of a robotic unit 300 (e.g., a picking unit for the robotic system 100 of FIG. 1, sometimes also referred to as a robotic subsystem) having in accordance with some embodiments of the present technology. In the illustrated embodiment, the robotic system 100 includes a robotic arm 310 and an end-effector (e.g., an object gripping assembly 320) attached to/carried by the robotic arm 310. As illustrated in FIG. 3, the robotic arm 310 can include a first flange 312 and one or more joints 314 (three shown), while the object gripping assembly 320 includes a second flange 322 operably couplable to the first flange 312 of the robotic arm 310. When joined together, the first and second flanges 312, 322 can establish both a physical connection and one or more communicative connections (e.g., electrical connections, fluid connections, or other suitable communicative connections). The physical connections allow the robotic arm 310 to carry the object gripping assembly 320 while the communicative connections allow the object gripping assembly 320 to be controlled through a connection to the robotic arm 310.

The one or more joints 314 allow the robotic arm 310 to controllably position the object gripping assembly 320 over and/or adjacent a target object (e.g., the target object 112 of FIG. 1). Once positioned, the object gripping assembly 320 can be operated to grip the target object. The one or more joints 314 also then the robotic arm 310 to controllably position the object gripping assembly 320 to move the target object between locations (e.g., between a pick-up location and a drop-off location). Once the object gripping assembly 320 is positioned over a desired location, the object gripping assembly 320 can be operated to release the target object. Additional details on the operation of the object gripping assembly 320 are provided below with respect to FIG. 4A-FIG. 13.

Figure 4A:
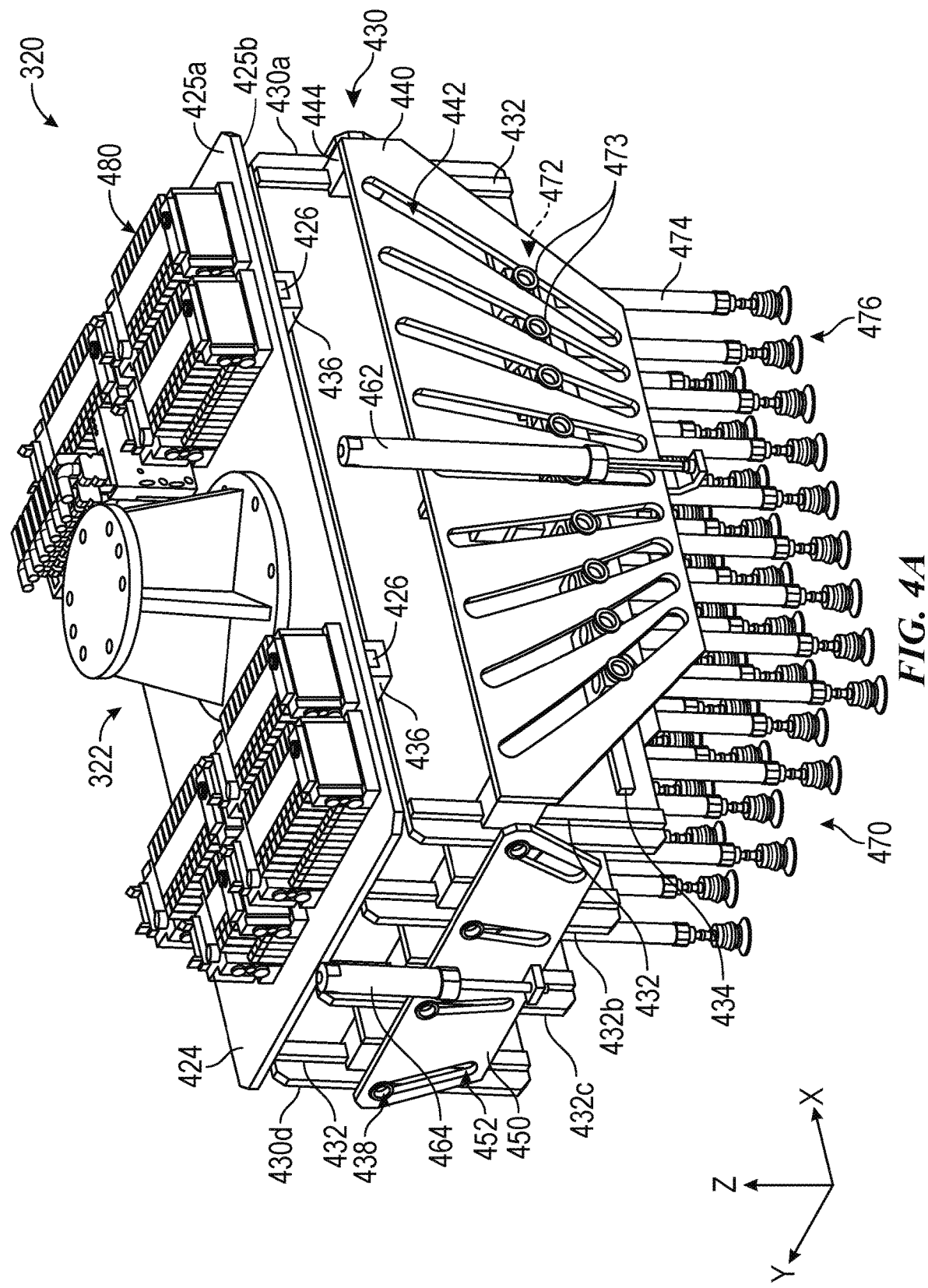
FIGS. 4A and 4B are isometric views of the object gripping assembly in accordance with some embodiments of the present technology.
Figure 4B:
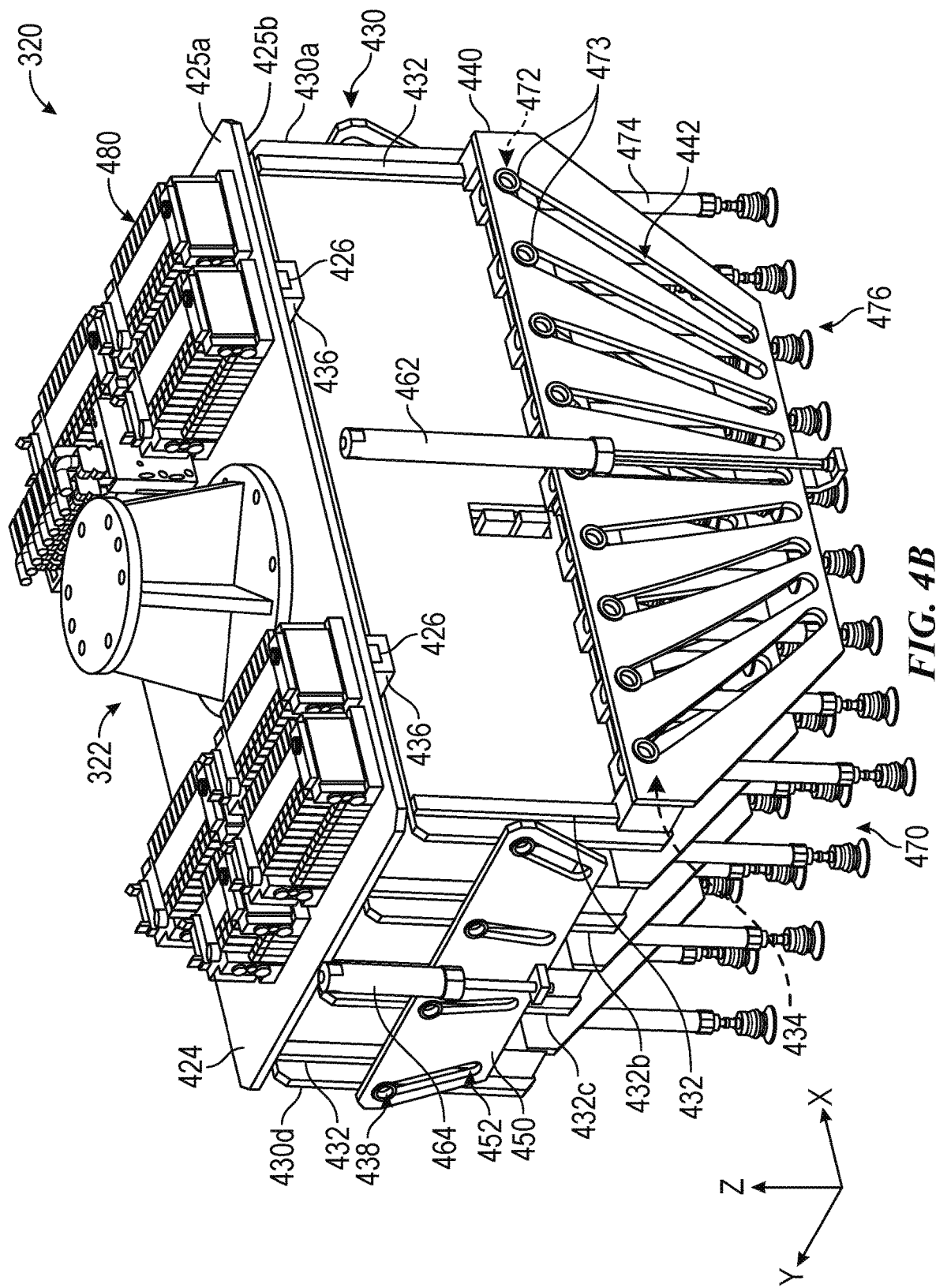

FIGS. 4A and 4B are isometric views of the object gripping assembly 320 in accordance with some embodiments of the present technology. As illustrated, the object gripping assembly 320 can include a first carrying plate 424, one or more second carrying plates 430 (four shown, labelled individually as second carrying plates 430a-430d) carried by the first carrying plate 424, and two or more extendable gripping components 470 (e.g., thirty six in the illustrated embodiment, sometimes referred to as "extendable gripping elements") carried by the second carrying plates 430.

As illustrated in FIG. 4A, the second carrying plates 430 (sometimes also referred to herein as "lower carrying plates" and/or "vertical carrying plates") each include one or more vertical mounting tracks 432 (two shown on the front second carrying plate 430a) and one or more second mounting tracks 434 (one shown on the front second carrying plate 430a, sometimes also referred to herein as "second horizontal mounting tracks" and/or "horizontal mounting tracks"). Each of the extendable gripping components 470 includes a gripping component mounting element 472 (e.g., a ball bearing carriage, ball bearing glide plate, slidable carriage, transducer carriage, and the like) that is movably carried by the second mounting track 434. The gripping component mounting elements 472 and the second mounting track 434 allow each of the extendable gripping components 470 to be moved (e.g., slid, adjusted, and the like) along a first axis (e.g., the x-axis). In turn, the position of each of the extendable gripping components 470 along the first axis can be controlled by a first pitch adjustment plate 440 (sometimes also referred to as a first "adjustment plate") operably coupled to each of the second carrying plates 430 and the extendable gripping components 470 carried thereon (e.g., resulting in four first pitch adjustment plates 440 for the illustrated embodiment). To do so, in the illustrated embodiment, each of the extendable gripping components 470 includes a protrusion 473 (e.g., a bearing, roller, low friction element, and the like) while the first pitch adjustment plate 440 includes pitch grooves 442 (sometimes also referred herein to as "pitch slots," and "pitch tracks") that are positioned in a first plane (e.g., having components in the first axis and the vertical axis and being positioned in an x-z plane). Each of the protrusions 473 mates with an individual pitch groove 442 such that when the first pitch adjustment plate 440 is moved along the vertical axis, the horizontal component of the pitch grooves 442 controls the position of the protrusions 473 along the first axis. As a result, movement of the first pitch adjustment plate 440 along the vertical axis controls the position of each of the extendable gripping components 470 along the first axis.

Further, to adjust the pitch of the extendable gripping components 470 along the first axis, the pitch grooves 442 can have varying slopes, such as toward a central portion of the first pitch adjustment plate 440. A pitch groove with a steeper slope (e.g., having a smaller component in the x-direction) will cause less movement along the first axis. Conversely, a pitch groove with a shallower slope (e.g., having a larger component in the x-direction) will cause more movement along the first axis. If the pitch grooves 442 are then arranged with gradually decreasing slopes from the central portion to the peripheral portions, the central extendable gripping components 470 will move less than peripheral extendable gripping components 470 as the first pitch adjustment plate 440 moves. As a result, movement of the first pitch adjustment plate 440 adjusts the pitch of the extendable gripping components 470 along the first axis.

An example of the adjustment of the pitch of the extendable gripping components 470 is illustrated between FIGS. 4A and 4B. In the illustrated embodiment, the pitch grooves 442 are oriented such that the pitch of the extendable gripping components 470 decreases (e.g., distances between adjacent gripping components 470 increases) as the first pitch adjustment plate 440 moves downward between FIG. 4A and FIG. 4B. Conversely, if the first pitch adjustment plate 440 moves upward (e.g., between the position of FIG. 4B and the position in FIG. 4A), the pitch of the extendable gripping components 470 increases (e.g., distances between adjacent gripping components 470 decreases). It will be understood however, that the pitch grooves 442 can be oriented in an opposite manner such that the pitch of the extendable gripping components 470 decreases as a second pitch adjustment plate 450 moves upward, and increases as the second pitch adjustment plate 450 moves downward.

To control the adjustment of the pitch of the extendable gripping components 470, the object gripping assembly 320 includes features that control the vertical position of the first pitch adjustment plate 440. For example, in the illustrated embodiment, the first pitch adjustment plates 440 each include adjustment plate mounting elements 444 (e.g., a ball bearing carriage, ball bearing glide plate, slidable carriage, transducer carriage, and the like) that are at least partially movably carried by the vertical mounting tracks 432 on each of the second carrying plates 430. One or more first expandable components 462 are carried by each of the second carrying plates 430 (e.g., one for each of the second carrying plate 430). The first expandable components 462 are operably coupled between the second carrying plate 430 and a corresponding first pitch adjustment plate 440 such that the expansion (or retraction) of the first expandable components 462 controls the vertical position of the first pitch adjustment plate 440. As a result, the expansion (or retraction) of the first expandable components 462 controls the pitch of the extendable gripping components 470 along the first axis.

In various embodiments, the first expandable components 462 can include various hydraulic cylinders (e.g., gas, liquid, and/or any other suitable hydraulics), hydraulic struts, spring struts, twist-driven expanding components, screw jacks, telescoping elements, an extension and retraction rod integral to an outer housing, and the like. In some embodiments, the first expandable components 462 are controlled simultaneously, resulting in a uniform adjustment to the pitch of the extendable gripping components 470 on each of the second carrying plates 430. In some embodiments, the first expandable components 462 are independently controllable, allowing for the pitch of the extendable gripping components 470 to vary between the second carrying plates 430 (e.g., the pitch of the extendable gripping components 470 on the front second carrying plate 430a can be different from the pitch of the extendable gripping components 470 the rear second carrying plate 430b).

In the illustrated embodiment, each of the pitch grooves 442 has a slightly curved slope. The curved slopes allow for a consistent, uniform adjustment of the pitch of the extendable gripping components 470. That is, the curved slopes can help maintain equal spacing between each of the extendable gripping components 470 as the first pitch adjustment plate 440 moves in the vertical direction. In various other embodiments, however, one or more of the pitch grooves 442 can have a linear slope, resulting in a constant adjustment of the attached gripping component along the first axis for any movement of the first pitch adjustment plate 440 along the vertical axis.

In addition to controlling the pitch of the extendable gripping components 470 along the first axis, the object gripping assembly 320 includes features that control the pitch of the extendable gripping components 470 along a second axis at least partially orthogonal to the first axis (e.g., the y-axis). For example, as further illustrated in FIGS. 4A and 4B, the first carrying plate 424 (sometimes also referred to as an "upper carrying plate" and/or a "horizontal carrying plate") has an upper surface 425a and a lower surface 425b opposite the upper surface. The lower surface 425b can include one or more first mounting tracks 426 (two shown, sometimes also referred to herein as "first mounting tracks" and/or "first horizontal mounting tracks") extending along the second axis, and the second carrying plates 430 are movably carried by the first mounting tracks 426. For example, in the illustrated embodiment, each of the second carrying plates 430 includes at least one carrying plate mounting element 436 (e.g., a ball bearing carriage, ball bearing glide plate, slidable carriage, transducer carriage, and the like) for each of the first mounting tracks 426 (e.g., two carrying plate mounting elements 436 shown). The carrying plate mounting elements 436 and the first mounting tracks 426 allow each of the second carrying plates 430 to be moved (e.g., slid, adjusted, and the like) along the second axis. The movement of the second carrying plates 430 also moves the extendable gripping components 470 carried thereon.

Further, in the illustrated embodiment, the object gripping assembly includes one or more second pitch adjustment plates 450 (two shown, one labelled, sometimes also referred to as second "adjustment plates," "second pitch adjustment components," and/or "adjustment components") each operably coupled to the first carrying plate 424 and the second carrying plates 430 carried thereon. The second pitch adjustment plates 450 function similar to the first pitch adjustment plates 440 discussed above to translate their vertical movement into a horizontal adjustment of the second carrying plates 430 along the second axis.

For example, as illustrated, each of the second carrying plates 430 can include one or more protrusions 438 (e.g., one for each of the second pitch adjustment plates 450) while the second pitch adjustment plates 450 include pitch grooves 452 that are positioned in a second plane (e.g., having components in the second axis and the vertical axis and being positioned in a y-z plane). Each of the protrusions 438 mates with an individual pitch groove 452 such that when the second pitch adjustment plates 450 are moved along the vertical axis, the horizontal component of the pitch grooves 452 controls the position of the protrusions 438 along the second axis. As a result, movement of the second pitch adjustment plates 450 along the vertical axis controls the position of each of the second carrying plates 430 along the second axis.

Further, similar to the discussion above, the pitch grooves 452 can have varying slopes (illustrated here as sloping toward a central portion of the second pitch adjustment plates 450) to adjust the pitch of the second carrying plates 430 along the second axis. The pitch grooves 452 can then be arranged with gradually decreasing slopes from the central portion to the peripheral portions. As a result, the central second carrying plates 430 (e.g., the center two second carrying plates) will move less than peripheral second carrying plates 430 (e.g., the front and rear second carrying plates) as the second pitch adjustment plates 450 move, thereby adjusting the pitch of the second carrying plates 430. In the illustrated embodiment, the pitch grooves 452 are oriented such that the pitch of the second carrying plates 430 increases as the second pitch adjustment plates 450 move upward, and decreases as the second pitch adjustment plates 450 move downward. However, it will be understood that the pitch grooves 452 can be oriented in an opposite manner such that the pitch of the second carrying plates 430 decreases as the second pitch adjustment plates 450 move upward, and increases as the second pitch adjustment plates 450 move downward.

To control the adjustment of the pitch of the extendable gripping components 470 along the second axis, the object gripping assembly 320 can also include features that control the vertical position of the second pitch adjustment plates 450. For example, in the illustrated embodiment, one or more second expandable components 464 are carried by the first carrying plate 424 (e.g., one for each second pitch adjustment plate). The second expandable components 464 are operably coupled between the first carrying plate 424 and the corresponding second pitch adjustment plates 450 such that the expansion (or retraction) of the second expandable components 464 controls the vertical position of the second pitch adjustment plate 450. As a result, the expansion (or retraction) of the second expandable components 464 controls the pitch of the second carrying plates 430, and therefore the extendable gripping components 470, along the second axis.

As discussed above, each combination of a first expandable component 462, a first pitch adjustment plate 440, and the operational coupling between the same can controllably adjust the pitch of the extendable gripping components 470. Accordingly, each combination is sometimes referred to collectively as a "first pitch adjustment mechanism" and/or a "first pitch adjustment component" that controls the pitch of the extendable gripping components 470 along the first axis. Similarly, the second pitch adjustment plate 450 and the second expandable components 464 discussed above with respect to are sometimes referred to collectively as a "second pitch adjustment mechanism" and/or a "second pitch adjustment component" that controls the pitch of the second carrying plates 430, and therefore the extendable gripping components 470 carried thereon, along the second axis.

As further illustrated in FIGS. 4A and 4B, each of the extendable gripping components 470 includes an expandable body 474 and a gripping element 476 at a distal end of the expandable body 474. In various embodiments, the expandable body 474 can include various hydraulic cylinders (e.g., gas, liquid, and/or any other suitable hydraulics), hydraulic struts, spring struts, twist-driven expanding components, screw jacks, telescoping elements, an extension and retraction rod integral to an outer housing, and/or any other expanding mechanism. Further, in various embodiments, the gripping element 476 can include a suction element, a vacuum port, a magnetic component, a pneumatic gripper, a robotic gripper, and/or any other suitable element.

The expandable body 474 drives movement of the gripping element 476 in the vertical direction (e.g., along the z-axis), allowing the gripping element 476 to be controllably raised and lowered. In some embodiments, each of the extendable gripping components 470 is independently controllable to extend and/or actuate the extendable gripping components 470, thereby allowing any suitable subset of the extendable gripping components 470 to be operated at a time. Purely by way of example, the object gripping assembly 320 can omit a row and/or column of the extendable gripping components 470 during operation when the row and/or column is not needed to grip and/or transport the target object.

To facilitate the independent operation, as further illustrated in FIGS. 4A and 4B, the object gripping assembly 320 can include a plurality of onboard controllers 480 (e.g., electrical controllers, vacuum ejectors, solenoids, and the like) operably coupled to the extendable gripping components 470. Additionally, or alternatively, the onboard controllers 480 can be operably coupled to each of the first and second expandable components 462, 464 to control their operation. In various embodiments, each of the onboard controllers 480 can be operably coupled to a centralized controller on the object gripping assembly 320 (not shown) and/or a centralized controller operably coupled to the robotic system 100 (e.g., the controller 109 of FIG. 1 having the processor 202 of FIG. 2).

Figure 5:
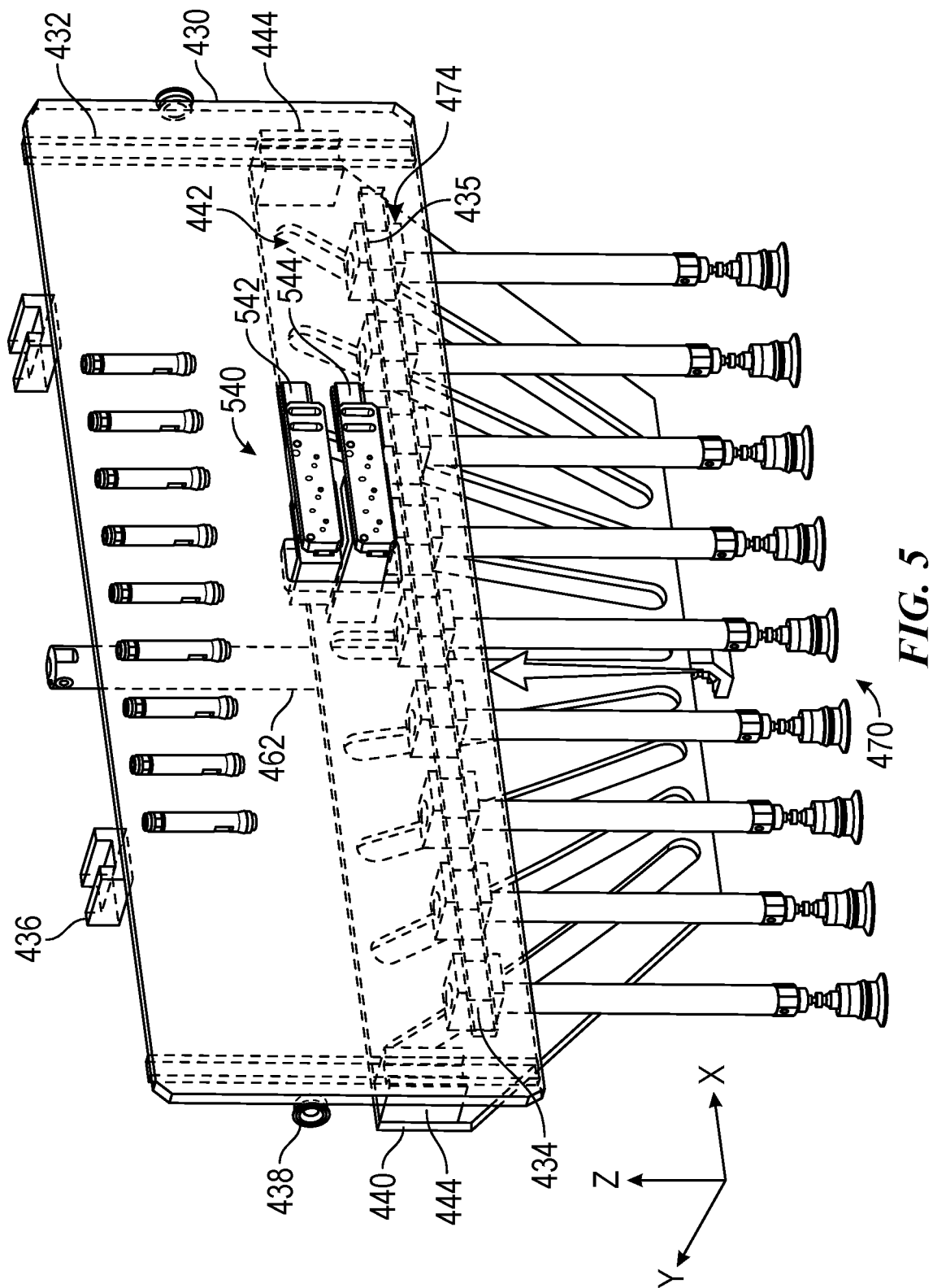
FIG. 5 is an isometric view of a pitch adjustment component in accordance with some embodiments of the present technology.

FIG. 5 is an isometric view of a single second carrying plate 430 illustrating additional details of the first pitch adjustment component of FIGS. 4A and 4B. In the embodiment illustrated in FIG. 5, the second carrying plate 430 includes two vertical mounting tracks 432 and a single second mounting track 434. Further, in the illustrated embodiment, nine extendable gripping components 470 are carried by the second mounting track 434. Each of the extendable gripping components 470 includes an individual gripping component mounting element 472 slidably coupled to the second mounting track 434. As a result, each of the extendable gripping components 470 can move along the first axis (e.g., along the x-axis), but is fixed in position along the vertical axis (e.g., the z-axis) and the second axis (e.g., the y-axis) with respect to the second carrying plate 430.

In the illustrated embodiment, a single first pitch adjustment plate 440 is slidably carried by the vertical mounting tracks 432 through two adjustment plate mounting elements 444. As a result, the first pitch adjustment plate 440 can move along the vertical axis but is fixed in position along the first and second axes. The first pitch adjustment plate 440 includes nine pitch grooves 442, each operably coupled to a corresponding extendable gripping component 470. As discussed above, the varying slopes of the pitch grooves 442 adjusts the pitch of the extendable gripping components 470 as the first pitch adjustment plate 440 moves. In the illustrated embodiment, a single expandable component 462 is carried by the second carrying plate 430 and operably coupled to the first pitch adjustment plate 440. Expansion of the expandable component 462 moves the first pitch adjustment plate 440 along the vertical axis, thereby controlling the pitch of the extendable gripping components 470.

As further illustrated in FIG. 5, the second carrying plate 430 can include a stopping mechanism 540. In the illustrated embodiment, the stopping mechanism 540 includes a first stopper 542 and a second stopper 544. As described in more detail below with respect to FIGS. 6 and 7, the first stopper 542 can be used to prevent movement of the first pitch adjustment plate 440 above a predetermined position with respect to the second carrying plate 430. As a result, the first stopper 542 can set a maximum pitch for the extendable gripping components 470. Similarly, the second stopper 544 can be used to prevent movement of the first pitch adjustment plate 440 below a predetermined position with respect to the second carrying plate 430. As a result, the second stopper 544 can set a minimum pitch for the extendable gripping components 470.

In some embodiments, the predetermined positions of the first and second stoppers 542, 544 is adjustable. As a result, the minimum and/or maximum pitch of the extendable gripping components 470 can be set according to an intended use. Purely by way of example, the minimum pitch can be set at a first operational pitch and the maximum can be set at a second operational pitch. The extendable gripping components 470 can then be quickly moved between the first and second operational pitches by quickly lowering and raising the first pitch adjustment plate 440 into the first and second stoppers 542, 544. In various embodiments, the stopping mechanism 540 can include any other suitable number of stoppers (e.g., one stopper, two stoppers, five stoppers, ten stoppers, and/or any other suitable number). Further, in various embodiments, one or more of the stoppers on the stopping mechanism 540 can have a fixed position. Purely by way of example, the stopping mechanism 540 can include twenty stoppers positioned to incrementally adjust the pitch range for the extendable gripping components 470.

Figure 6:
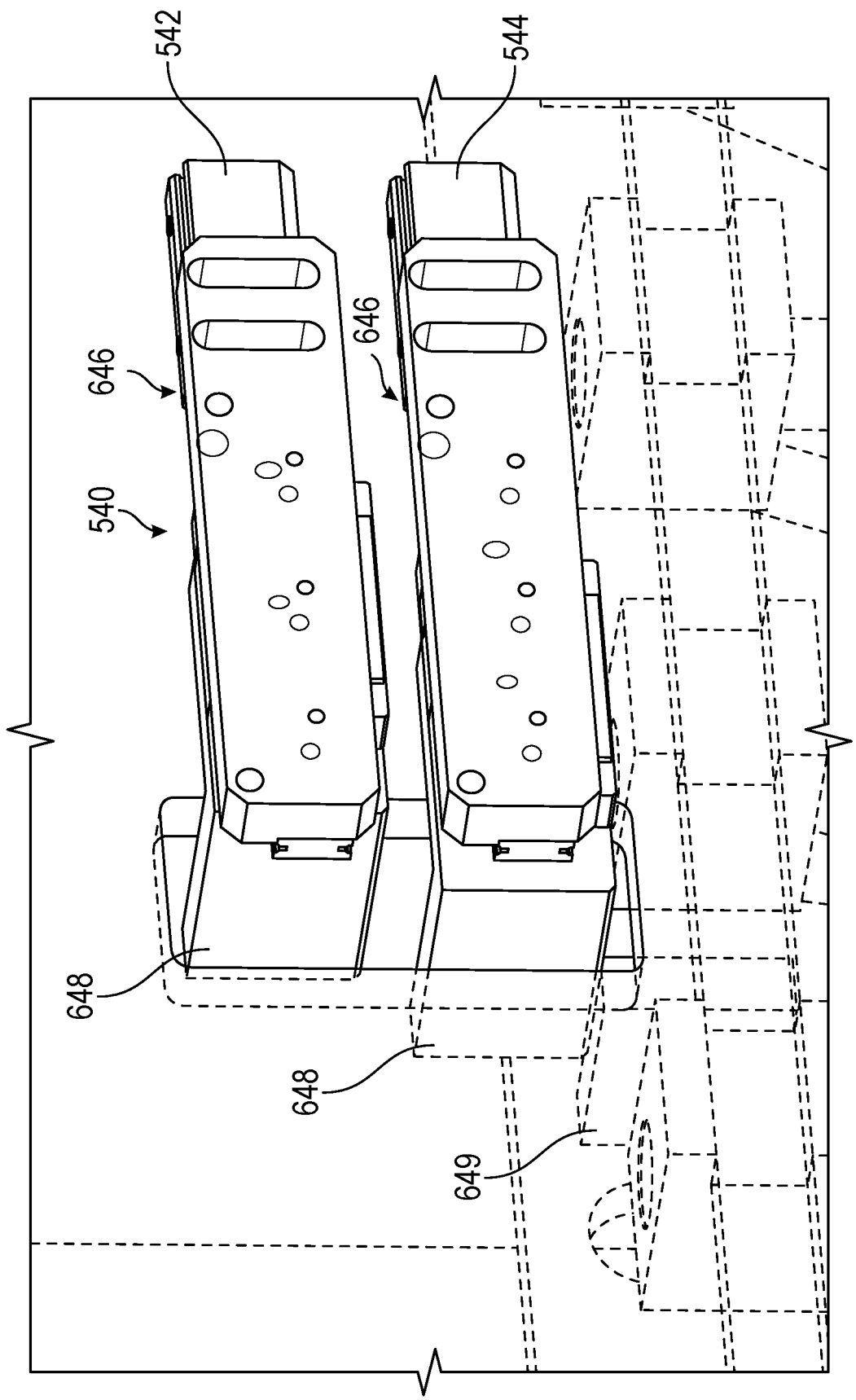
FIGS. 6 and 7 are isometric views of a stopping mechanism for a pitch adjustment component in accordance with some embodiments of the present technology.
Figure 7:
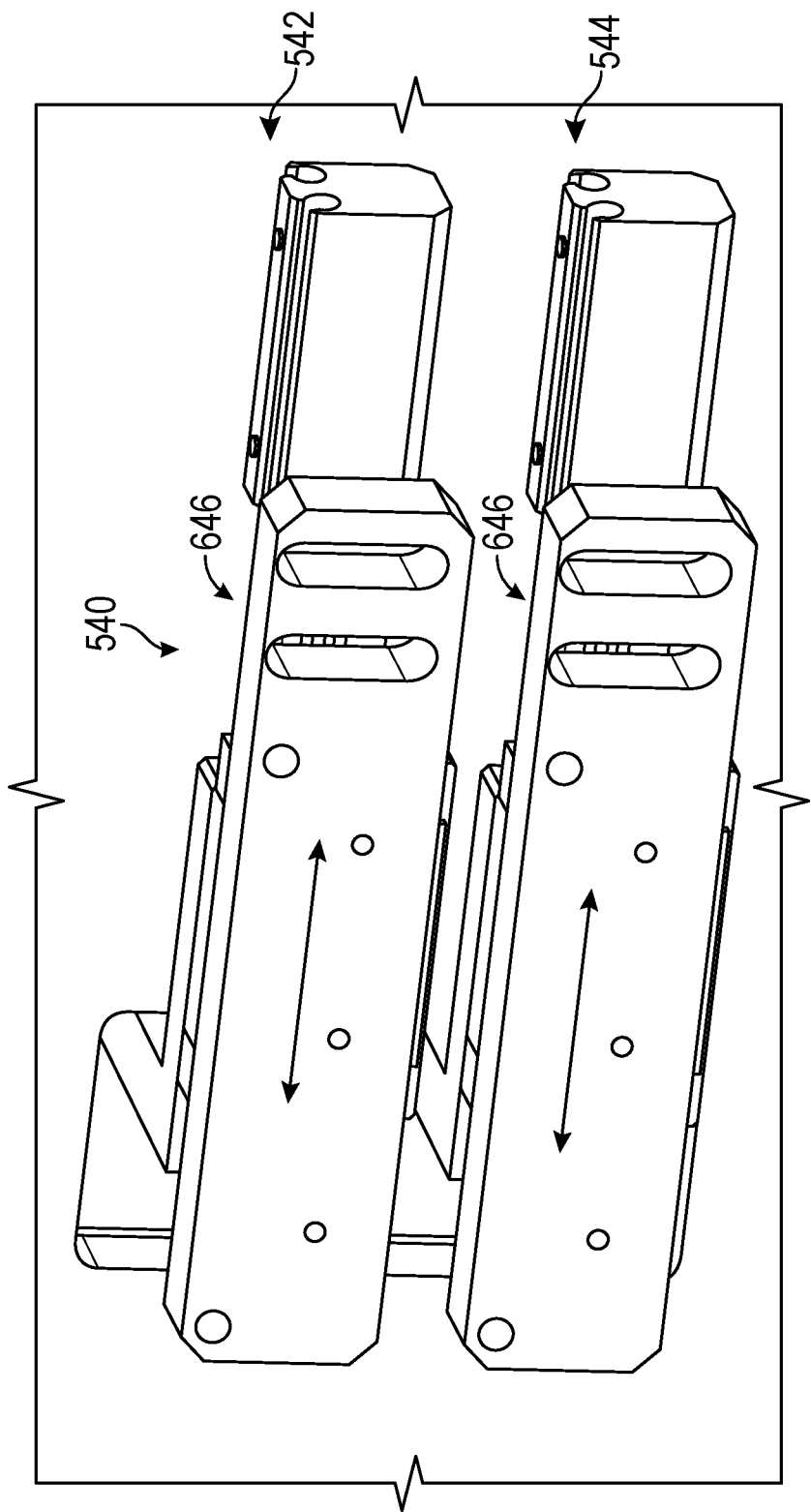

FIGS. 6 and 7 are isometric views of the stopping mechanism 540 for a pitch adjustment component in accordance with some embodiments of the present technology. In the illustrated embodiment, the stopping mechanism 540 includes a first stopper 542 and a second stopper 544 at fixed incremental positions to set a maximum or minimum pitch for the extendable gripping components 470 (FIG. 5). As best illustrated in FIG. 6, each of the first and second stoppers 542, 544 includes an adjustable slider 646 and a first engaging portion 648. can be actioned between an engaged position and a disengaged position. The adjustable slider 646 allows the first and second stoppers 542, 544 to be transitioned from an engaged position to a disengaged position. For example, in the embodiment illustrated in FIG. 6, the second stopper 544 is in the engaged position such that the first engaging portion 648 of the second stopper 544 contacts a second engaging portion 649 carried by the first pitch adjustment plate 440 to prevent further upward movement of the first pitch adjustment plate 440. In the disengaged position, the first and second engaging portions 648, 649 do not make contact, allowing the first pitch adjustment plate 440 to move freely. As best illustrated in FIG. 7, the adjustable slider 646 allows the first and second stoppers 542, 544 to be quickly toggled between the engaged position (e.g., slid all the way to the left) and the disengaged position (e.g., slid all the way to the right).

Figure 8A:
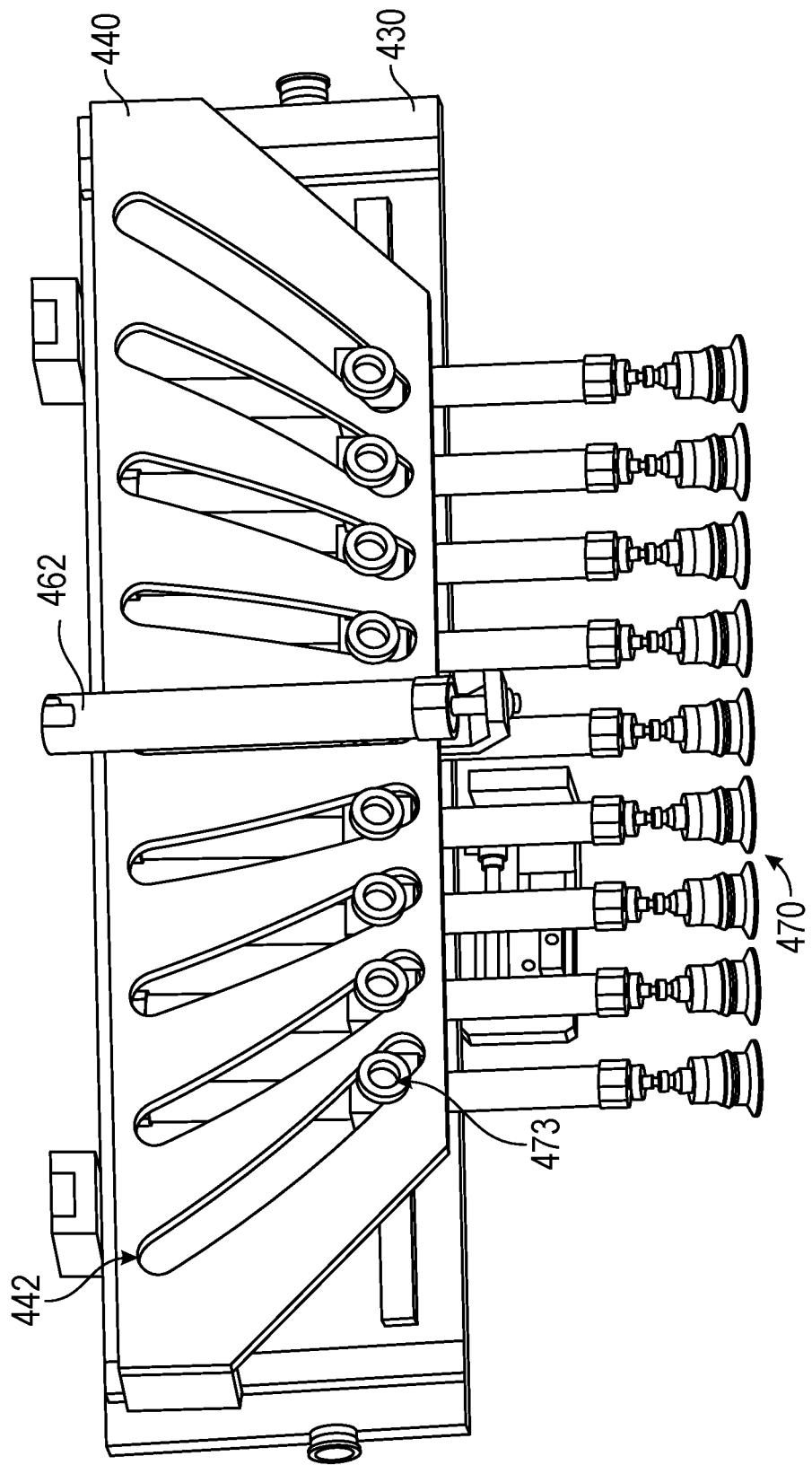
FIGS. 8A and 8B are isometric views of the pitch adjustment component at various pitch settings in accordance with some embodiments of the present technology.
Figure 8B:
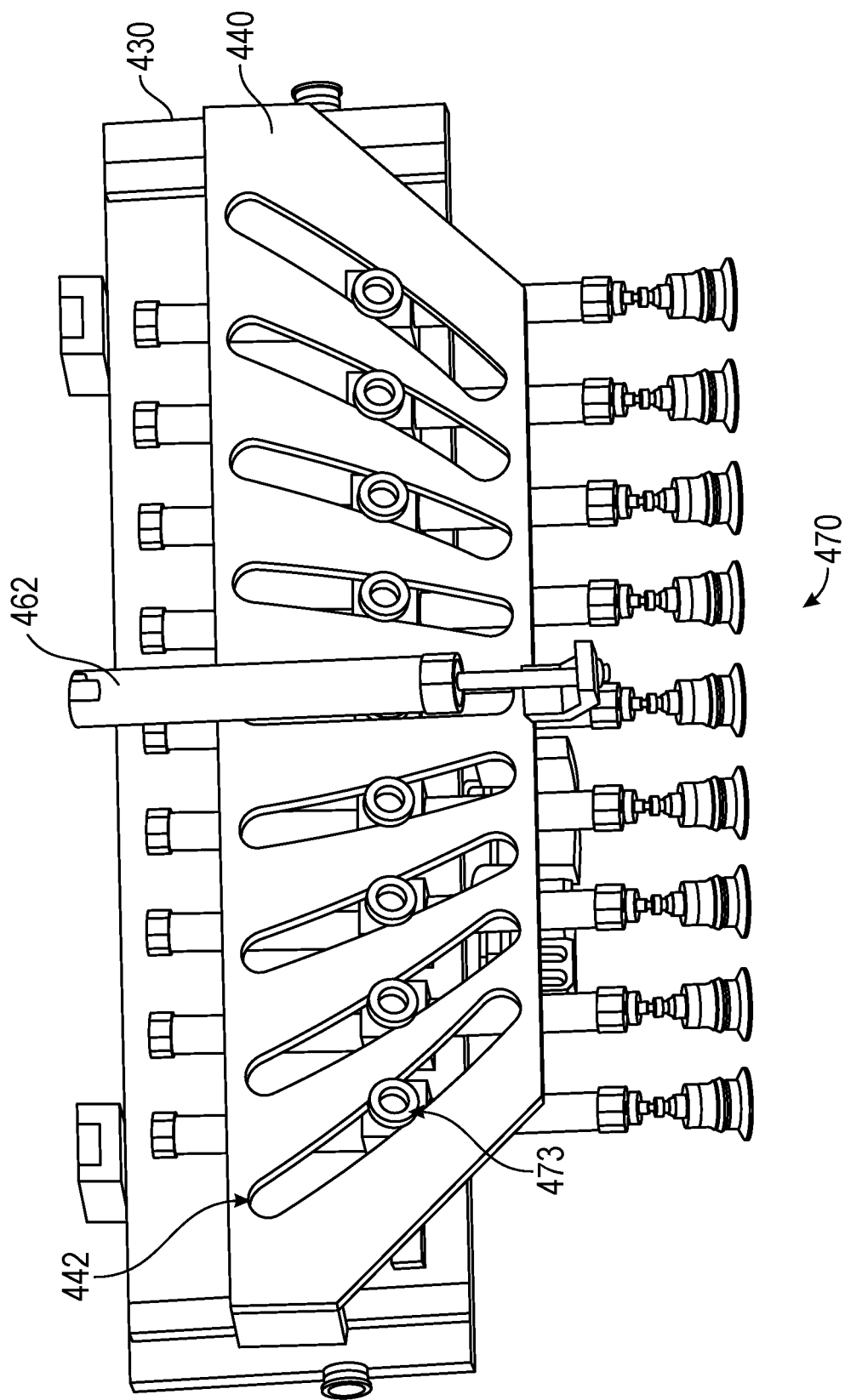

FIGS. 8A and 8B are isometric views of the first pitch adjustment component at various pitch settings in accordance with some embodiments of the present technology. In the illustrated embodiment, the pitch grooves 442 are sloped such that raising the first pitch adjustment plate 440 reduces the pitch of the extendable gripping components 470, while lowering the first pitch adjustment plate 440 increases the pitch. For example, as illustrated with respect to FIG. 8A, when the expandable component 462 is fully retracted, the first pitch adjustment plate 440 is raised to a maximum height with respect to the second carrying plate 430. As a result, the pitch of the extendable gripping components 470 is at a minimum, resulting in a close packing of the extendable gripping components 470. The illustrated configuration is useful, for example, to pick up a plurality of small, closely packed target objects and/or a relatively small, heavy target object (e.g., requiring each of the extendable gripping components 470 to securely lift). As illustrated with respect to FIG. 8B, as the expandable component 462 is extended, the first pitch adjustment plate 440 is lowered with respect to the second carrying plate 430. As a result, the pitch of the extendable gripping components 470 is increased, resulting in a less dense packing of the extendable gripping components 470 compared to FIG. 8A. The illustrated configuration is useful, for example, to pick up a plurality of smaller target objects and/or a larger target object (by, e.g., separating the grip locations across a larger area).

As discussed above, however, it will be understood that the slopes of the pitch grooves 442 can be inversed such that raising the first pitch adjustment plate 440 increases the pitch of the extendable gripping components 470, while lowering the first pitch adjustment plate 440 reduces the pitch. Further, it will be understood that the expandable component 462 can be coupled between the second carrying plate 430 and the first pitch adjustment plate 440 in a different position, such that expansion of the expandable component 462 raises the first pitch adjustment plate 440 with respect to the second carrying plate 430 instead of lowering the first pitch adjustment plate 440.

Suitable Methods of Operating the Object Gripping Assembly

Figure 9:
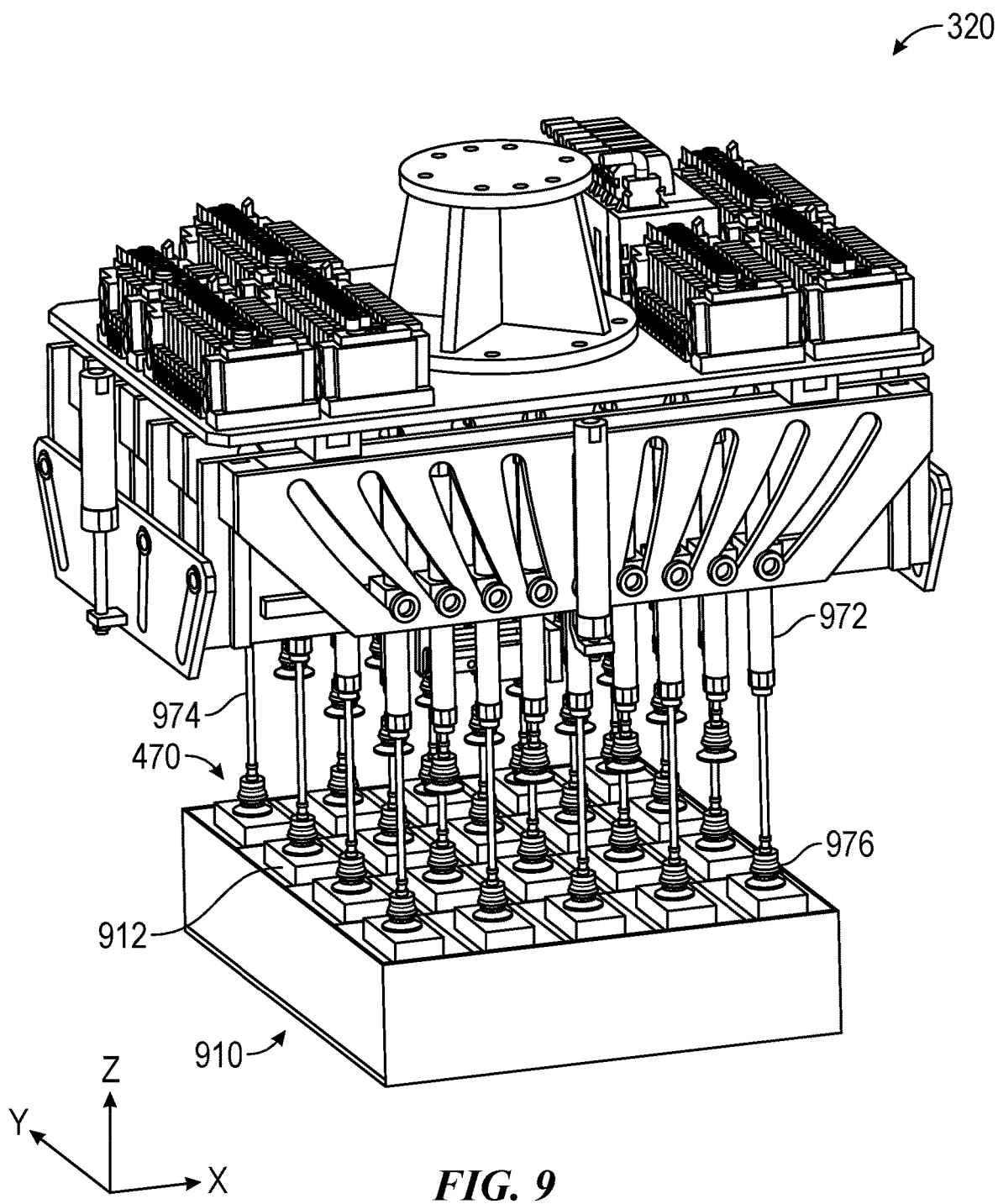
FIGS. 9-11 are isometric views of the object gripping assembly at various operational parameters in accordance with some embodiments of the present technology.
Figure 10:
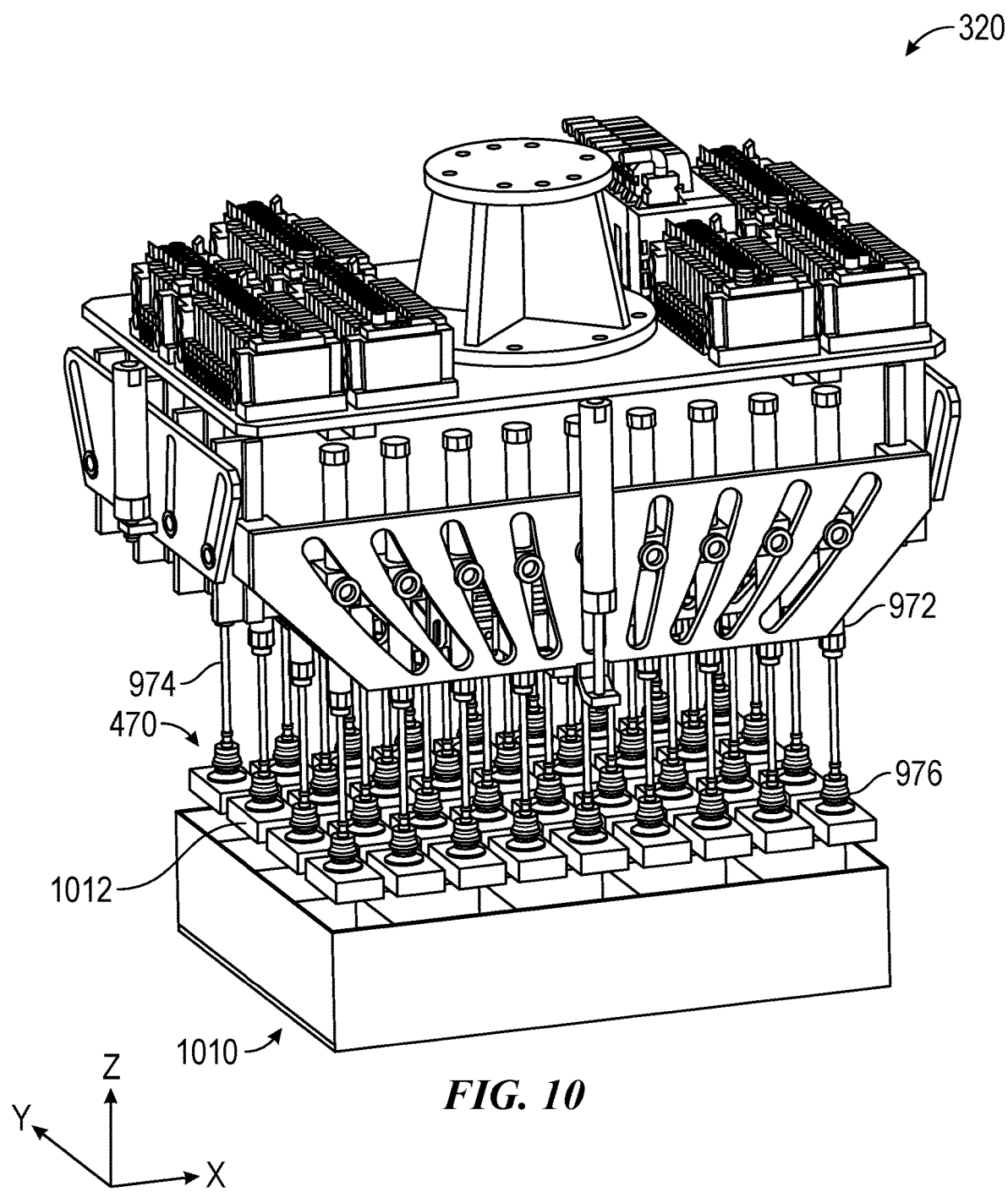
Figure 11:
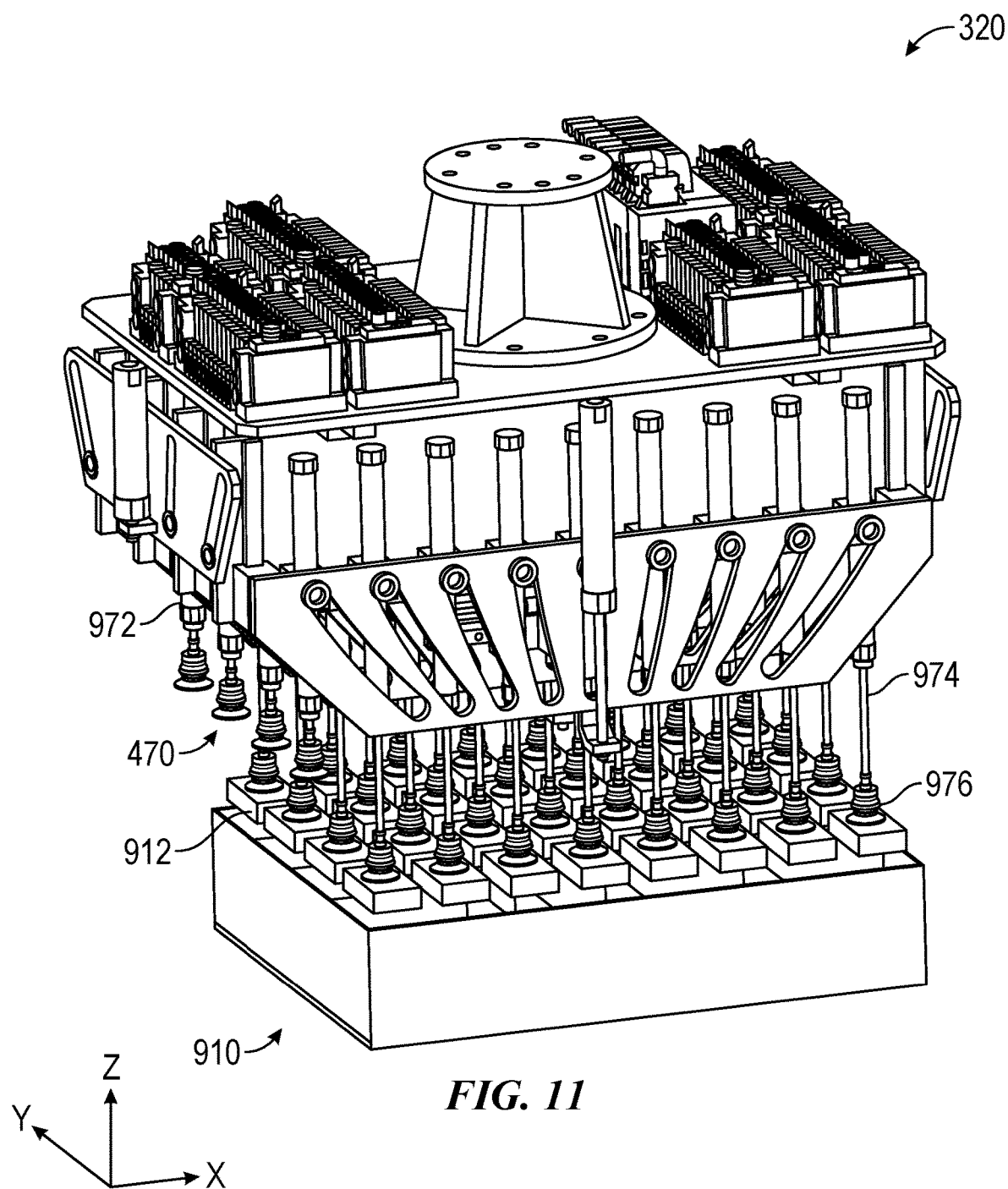

FIGS. 9-11 are isometric views of an object gripping assembly 320 at various operational parameters in accordance with some embodiments of the present technology. In each of the illustrated operational parameters, the object gripping assembly 320 can be used to pick up, place, and/or transfer a plurality of target objects 912, 1012, 1112 from a first location in a carrier 910, 1010, 1110 (e.g., a truck bed, a packaging container, and the like) to a second location (e.g., on a conveyor belt, into a second container, and the like).

In the embodiment illustrated in FIG. 9, the object gripping assembly 320 includes thirty-six extendable gripping components 470, while the plurality of target objects 912 includes twenty objects to be lifted out of the carrier 910. Accordingly, the object gripping assembly 320 (or a controller in communication therewith, such as controller 109 of FIG. 1 having the processor 202 of FIG. 2) can determine a subset of the extendable gripping components 470 to operate, as well as a desired pitch for the subset of the extendable gripping components 470 in both the first and second axes. In the illustrated embodiment, the operational parameters include adjusting the pitch of the extendable gripping components 470 to (or near) the minimum pitch along the x-axis and adjusting to (or near) the maximum pitch along the y-axis. The operational parameters also include operating every other extendable gripping component 470 along the x-axis (e.g., every other extendable gripping component 470 along a given second carrying plate 430). As a result of the operational parameters, a subset of twenty of the extendable gripping components 470 are well aligned to pick the plurality of target objects 912 out of the carrier 910. Accordingly, as illustrated, only the subset of the extendable gripping components 470 are extended during operation.

It will be understood, however, that the illustrated operational parameters are merely an example of the suitable operational parameters for the plurality of target objects 912. In various embodiments, the range of possible pitches for the extendable gripping component 470 can vary, allowing (or requiring) an alternative adjustment of the pitches. Further, multiple pitches may be possible to align a suitable subset of the extendable gripping components 470 with the plurality of target objects 912. Even further, it will be understood that the object gripping assembly 320 can include any other suitable number of extendable gripping components 470 that are accounted for by the operational parameters. For example, the object gripping assembly 320 can include two, three, four, five, ten, fifty, one hundred, one thousand, or any other suitable number of extendable gripping components 470 that are each accounted for by the operational parameters.

Further, in the embodiment illustrated in FIG. 9, each of the extendable gripping components 470 can include an outer housing 972, an extendable rod 974 protruding a controllable distance from the outer housing 972, and a suction element 976 carried by a distal end of the extendable rod 974. The position of the extendable rod 974 can be controlled by any suitable hydraulics, screwing mechanism, and/or any other suitable mechanism. Further, each extendable rod 974 can place the corresponding suction element 976 in fluid communication with an actuator on the object gripping assembly 320 to control the grip of the suction element 976. As discussed above, however, the extendable gripping components 470 can include various other hydraulic cylinders (e.g., gas, liquid, and/or any other suitable hydraulics), hydraulic struts, spring struts, twist-driven expanding components, screw jacks, and/or telescoping elements to move a gripping element along the vertical axis. Similarly, as discussed above, the gripping element can include another suction element, a vacuum port, a magnetic component, a pneumatic gripper, a robotic gripper, and/or any other suitable element.

In the embodiment illustrated in FIG. 10, the object gripping assembly 320 includes thirty-six extendable gripping components 470 and the plurality of target objects 1012 includes thirty-six objects. Further, the carrier 1010 is configured with a denser packing of the plurality of target objects 1012. The object gripping assembly 320 (or a controller in communication therewith, such as the controller 109 of FIG. 1 having the processor 202 of FIG. 2) can determine a subset of the extendable gripping components 470 to operate, as well as a desired pitch for the subset of the extendable gripping components 470 in both the first and second axes. As illustrated in FIG. 10, the subset of the extendable gripping components 470 can include the entirety of the extendable gripping components 470.

In the illustrated embodiment, the operational parameters include adjusting the pitch of the extendable gripping components 470 to a mid-range pitch along the x-axis and adjusting to (or near) the minimum pitch along the y-axis. The operational parameters also include operating every extendable gripping component 470 on the object gripping assembly 320. As a result of the operational parameters, each extendable gripping component 470 is well aligned to pick a corresponding target object out of the carrier 1010. Accordingly, as illustrated, all of the extendable gripping components 470 on the object gripping assembly 320 are operated concurrently.

In the embodiment illustrated in FIG. 11, the object gripping assembly 320 includes thirty-six extendable gripping components 470, while the plurality of target objects 1112 includes thirty-two objects to be picked out of the carrier 1110. The object gripping assembly 320 (or a controller in communication therewith, such as controller of FIG. 1 having the processor 202 of FIG. 2) can determine a subset of the extendable gripping components 470 to operate, as well as a desired pitch for the subset of the extendable gripping components 470 in both the first and second axes.

In the illustrated embodiment, the operational parameters include adjusting the pitch of the extendable gripping components 470 to (or near) a maximum pitch along the x-axis and adjusting to (or near) the minimum pitch along the y-axis. The operational parameters also include omitting a single extendable gripping component 470 from a longitudinal end of each of the second carrying plates 430. As a result of the operational parameters, a subset of thirty-two of the extendable gripping components 470 are well aligned to pick a corresponding target object out of the carrier 1110. Then, as illustrated, only the subset of the extendable gripping components 470 are extended during operation.

Figure 12:
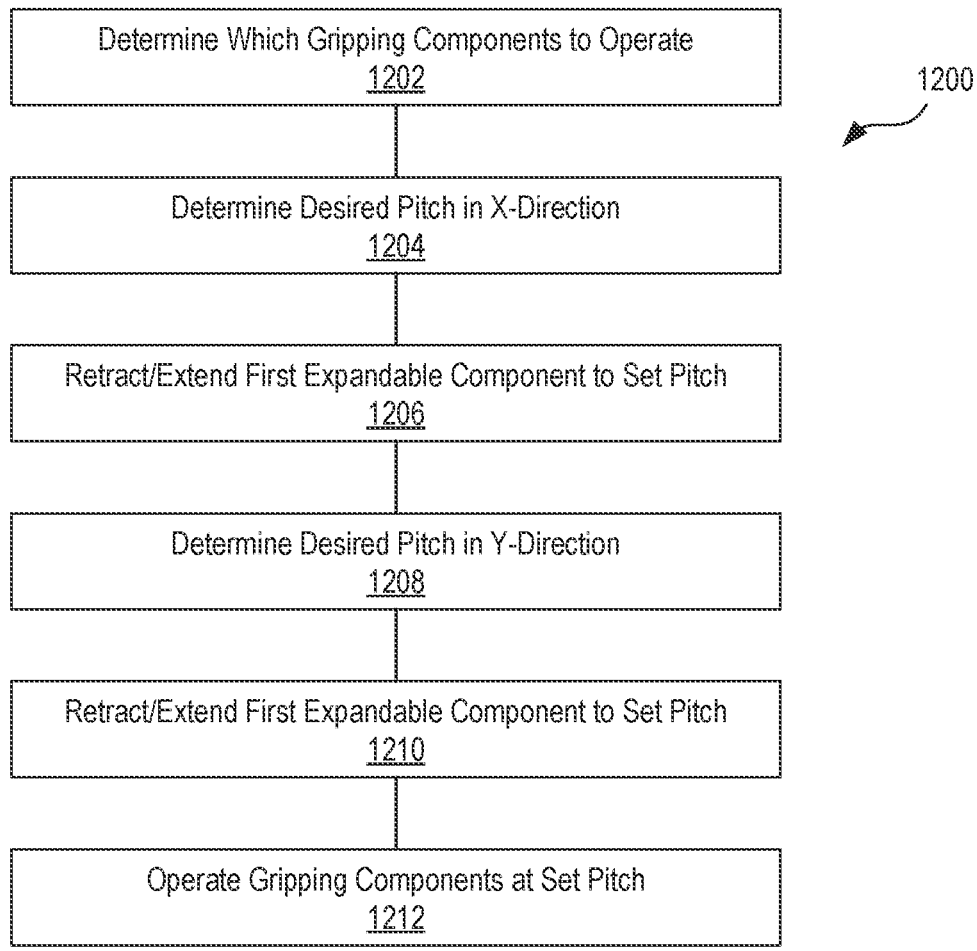
FIG. 12 is a flow diagram of a process for operating an object gripping assembly at various operational parameters in accordance with some embodiments of the present technology.

FIG. 12 is a flow diagram of a process 1200 for operating an object gripping assembly (e.g., the object gripping assembly 320 of FIG. 3) at various operational parameters in accordance with some embodiments of the present technology. The process 1200 can be executed by a controller on the object gripping assembly itself (e.g., one of the onboard controllers 480 discussed above with respect to FIG. 4) and/or by an external controller (e.g., the controller 109 of FIG. 1 having the processor 202 of FIG. 2).

The process 1200 begins at block 1202 by determining which extendable gripping components to operate. In some embodiments, the determination is based on an image and/or scan of one or more target objects and/or a carrier. In some embodiments, the determination is based on information received regarding one or more target objects and/or the carrier (e.g., information about the weight of the target object(s), the distribution of the target object(s), a surface texture of the target object(s) or any other information that might affect the gripping elements, and/or any other suitable information). In some embodiments, the determination includes planning multiple passes and determining which extendable gripping components to operate on each pass.

At block 1204, the process 1200 includes determining a desired pitch of the extendable gripping components that are being operated in a first direction (e.g., along a first axis, such as an x- or y-axis). As discussed above, the determination of the pitch in the first direction can be based on an image, scan, and/or any other information received regarding the one or more target objects and/or the carrier. Further, in some embodiments, the determination of the pitch is based at least partially on the determination of which extendable gripping components to operate. For example, the determination of the pitch can be based at least partially on a determination to operate only a subset of extendable gripping components. In another example, the determination of the pitch and the determination of which extendable gripping components to operate can be made concurrently (e.g., the determination of what extendable gripping components to operate can be based partially on what pitches are available for different subsets of the extendable gripping components). In some embodiments, the process 1200 includes determining a desired pitch of the extendable gripping components for each of the second carrying plates independently (e.g., the extendable gripping components on a front carrying plate can have a smaller pitch than the extendable gripping components on a rear carrying plate).

At block 1206, the process 1200 includes retracting or extending one or more first expandable components (e.g., the first expandable components 462 of FIG. 4A) to set the pitch of the extendable gripping components at (or near) the desired pitch in the first direction. In some embodiments, the pitch is monitored by an imaging component and/or other sensor. In some such embodiments, the first expandable component is expanded (or retracted) until the desired pitch is obtained. In some embodiments, the relationship between the state of the first expandable component and the pitch is known, and the expandable component is expanded (or retracted) until the desired pitch is obtained without being monitored.

At block 1208, the process 1200 includes determining a desired pitch of the extendable gripping components in a second direction (e.g., along a second axis, such as a y- or x-axis) that is at least partially orthogonal to the first direction. Like the determination of the pitch in the first direction, the determination of the pitch in the second direction can be based on an image, scan, and/or any other information received regarding the one or more target objects and/or the carrier. Further, in some embodiments, the determination of the pitch is based at least partially on the determination of which extendable gripping components to operate (e.g., based at least partially on a determination to operate only a subset of extendable gripping components, made concurrently with a determination of which subset of the extendable gripping components to operate, and the like).

At block 1210, the process 1200 includes retracting or extending one or more second expandable components (e.g., the second expandable components 464 of FIG. 4A) to set the pitch of the extendable gripping components at (or near) the desired pitch in the second direction. As discussed above, in some embodiments, the pitch is monitored by an imaging component and/or other sensor. In some such embodiments, the first expandable component is expanded (or retracted) until the desired pitch is obtained. In some embodiments, the relationship between the state of the first expandable component and the pitch is known, and the expandable component is expanded (or retracted) until the desired pitch is obtained without being monitored.

At block 1212, the process 1200 includes operating the extendable gripping components at the set pitches. That is, at block 1212, the process 1200 includes extending and/or actuating the subset of the extendable gripping components that the process determined to operate at block 1202 to pick up, set down, and/or transfer the one or more target objects.

Since each of the extendable gripping components can be actuated to grip and/or release a target object independently, a subset of the target objects that are gripped by the extendable gripping components can be selectively released at a destination. That is, for example, the process 1200 can extend a first subset of the extendable gripping components at the set pitches and actuate the first subset to pick up the target objects at a pick-up location. The process 1200 can then actuate second, third, fourth, etc. subsets to selectively release the target objects at one or more drop-off locations. In another example, the process 1200 can extend a first subset of the extendable gripping components at the set pitches and actuate the first subset to pick up the target objects at a first pick-up location, then actuate a second subset of the extendable gripping components at the set pitches and actuate the second subset to pick up the target objects at a second pick-up location. In some embodiments, the pitch is not adjusted between the two picking locations. In other embodiments, the pitch is adjusted between the two picking locations, allowing the process 1200 tailor to multiple pitches in a single operation. In some embodiments, each of the two sets of desired pitches are determined in blocks 1204 and 1208, such that the process 1200 can then re-execute blocks 1206 and 1210 without further determinations to adjust the pitch. In some embodiments, the process 1200 re-executes blocks 1204-1210 between the first pick-up location and the second pick-up location.

In some embodiments, the selective operation enables the object gripping assembly 320 (FIG. 3) to be used as a buffer to temporarily hold a subset of the target objects. For example, the robot system can receive an order to pick different target objects and place combinations of the different target objects as a group at two or more different drop locations. In another example, the robot system can receive an order to pick target objects and place combinations of the target objects sequentially, allowing another component of the robotic system to pick up and/or otherwise move a subset of the picked target objects before another subset is placed without requiring the object gripping assembly 320 (FIG. 3) to execute multiple picking operations.

It will be understood that, in some embodiments, one or more of the blocks 1202-1210 can be combined, executed in a different order, and/or omitted altogether. Purely by way of example, determining which of the extendable gripping components to operate can include determining the desired pitch in the first and/or second directions. That is, determining which of the extendable gripping components to operate can include determining what pitch the operated extendable gripping components should be at. Accordingly, in such embodiments, the process 1200 can omit blocks 1204 and 1208 to avoid redundant determinations. In another example, the process can execute blocks 1208 and 1210 before blocks 1204 and 1206 and/or execute block 1208 before block 1206. In yet another example, blocks 1204 and 1208 can be executed simultaneously and/or in parallel to determine the desired pitch for the extendable gripping components in the first and second directions concurrently. Similarly, blocks 1206 and 1210 simultaneously and/or in parallel to set the pitch of the extendable gripping components at (or near) the desired pitch in the first and second directions concurrently.

Figure 13:
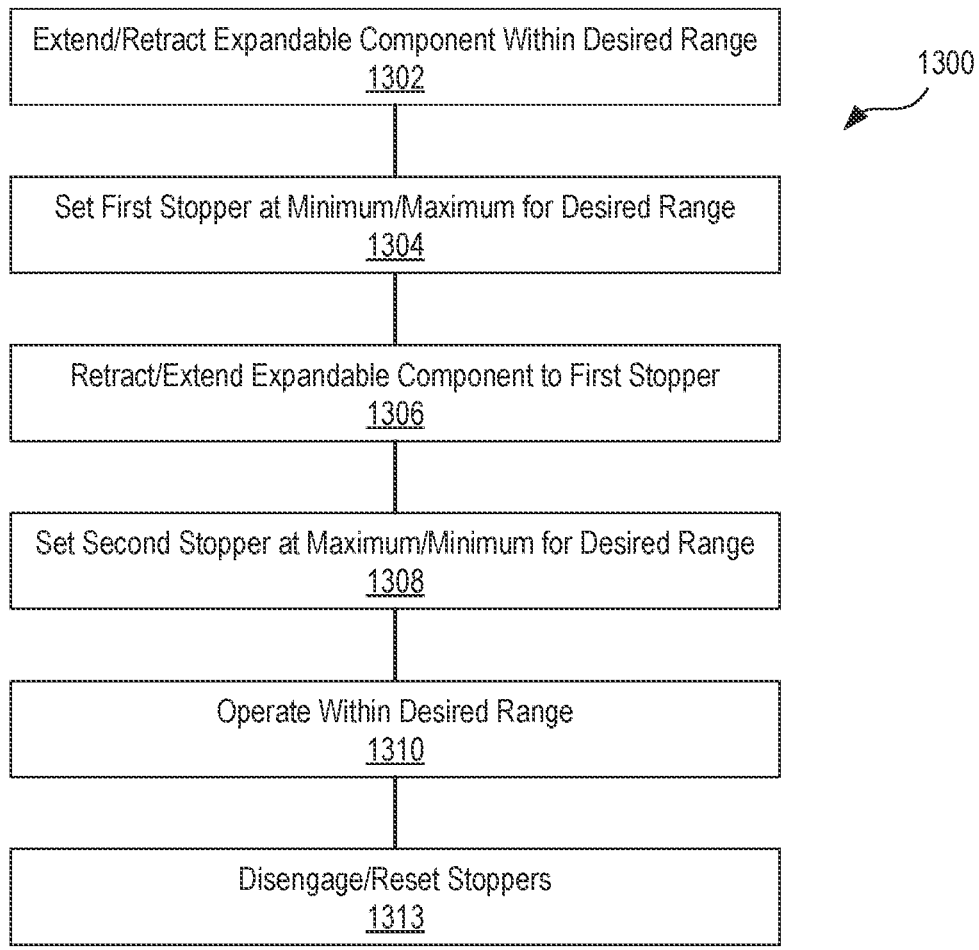
FIG. 13 is a flow diagram of a process for setting minimum and/or maximum operation settings for an object gripping assembly in accordance with some embodiments of the present technology.

FIG. 13 is a flow diagram of a process 1300 for setting minimum and/or maximum pitch parameters for an object gripping assembly in accordance with some embodiments of the present technology. Like the process 1200 discussed above with respect to FIG. 12, the process 1300 can be executed by a controller on the object gripping assembly itself (e.g., one of the onboard controllers 480 discussed above with respect to FIG. 4) and/or by an external controller (e.g., the controller 109 of FIG. 1 having the processor 202 of FIG. 2). The process 1300 is discussed herein with reference to the one or more second expandable components 464 discussed above with respect to FIG. 4. As discussed above, the second expandable component(s) are operably coupled to the second carrying plates to set the pitch of the second carrying plates. However, it will be understood that a similar process can be followed with respect to the first expandable component(s) to set minimum and/or maximum pitch parameters for the extendable gripping components on any given second carrying plate.

The process 1300 begins at block 1302 by expanding the second expandable component(s) within a desired range for the second expandable component(s). As a result, the pitch of the second carrying plates is reduced to be below a desired maximum pitch. In some embodiments, the second expandable component(s) are already within the desired range, allowing the process 1300 to skip block 1302.

At block 1304, the process 1300 includes setting a first stopping mechanism to an engaged position to prevent the second expandable component(s) from retracting beyond a first desired point, thereby preventing the actual pitch from increasing past the desired maximum. In some embodiments, the desired maximum can represent the larger of two or more operating pitches. In such embodiments, the first stopping mechanism allows the object gripping assembly to quickly toggle the pitch to the larger operating pitch by preventing the second expandable component(s) from retracting beyond the first desired point. For example, the second expandable component(s) can be quickly retracted and stopped by the first stopping mechanism, rather than requiring a careful retraction and precise stop.

At block 1306, the process 1300 includes retracting the second expandable component(s) within the desired range for the expandable component. As a result, the pitch of the second carrying plates is increased to be below above a minimum pitch. In some embodiments, the second expandable component(s) are already within the desired range, allowing the process 1300 to skip block 1306.

At block 1308, the process 1300 includes setting a second stopping mechanism to an engaged position to prevent the second expandable component(s) from expanding beyond a second desired point, thereby preventing the actual pitch from decreasing past the desired minimum. In some embodiments, the desired minimum can represent the smaller of two or more operating pitches. In such embodiments, the first stopping mechanism allows the object gripping assembly to quickly toggle the pitch to the smaller operating pitch by preventing the second expandable component(s) from expanding beyond the second desired point. For example, the expandable component can be quickly retracted and be stopped by the second stopping mechanism rather than requiring a careful retraction and precise stop.

At block 1310, the process 1300 includes operating the object gripping assembly within the desired range. As discussed above, during operation, the first and second stopping mechanisms prevent movement of the second expandable component(s), thereby allowing the object gripping assembly to quickly toggle between the minimum and maximum. In a specific, non-limiting example, the object gripping assembly can have two operating pitches for a specific project. The first desired point can correspond to the larger of two operating pitches, while the second first desired point can correspond to the smaller of two operating pitches. In such embodiments, the first and second stopping mechanisms can accelerate the operation of the object gripping assembly by allowing the object gripping assembly to quickly toggle between the two operating pitches (e.g., by eliminating the need for, or accelerating the process of, a slow alignment process with each change). The first and second stopping mechanisms can also prevent the pitch from being increased (or decreased) beyond the desired points based on spatial limitations. Purely by way of example, the maximum pitch can be set to prevent the pitch from encroaching on spatial limits of a carrier.

Further, as discussed above, each of the extendable gripping components can be operated independently, allowing the extendable gripping components to be extended and/or actuated to grip and/or release a target object independently. As a result, a subset of the target objects that are gripped by the extendable gripping components can be selectively released at any given destination and/or any subset of the extendable gripping components can be operated at a given pick-up location to pick target objects.

At block 1312, the process 1300 includes setting the first and second stopping mechanisms to a disengaged position and/or resetting the first and second stopping mechanisms. Once moved into the disengaged positions, the first and second stopping mechanisms do not impede movement of the second expandable component(s), thereby returning the second expandable component(s) to a full range of motion.

It will be understood that, in some embodiments, one or more of the blocks 1302-1310 can be combined, executed in a different order, and/or omitted altogether. Purely by way of example, as discussed above, either of blocks 1302 or 1306 can be omitted when the second expandable component(s) are already within the desired range. In another example, the process 1300 can include setting only a single stopping mechanism (e.g., setting a maximum pitch based on spatial requirements), and therefore omit blocks 1306 and 1308. In yet another example, when the second expandable component(s) are already within the desired range, the process can combine blocks 1304 and 1308 to set the first and second stopping mechanisms at the same time. And in yet another example, the process 1300 can execute blocks 1306 and 1308 before blocks 1302 and 1304 to engage the second stopping mechanism before engaging the first stopping mechanism.

Examples

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples can be combined in any suitable manner, and placed into a respective independent example. The other examples can be presented in a similar manner.

1. An object gripping assembly, comprising:
   a first carrying plate having:
      an upper surface, the upper surface including a flange configured to connect to a robotic arm; and
      a lower surface opposite the upper surface, the lower surface including at least one first mounting track extending along a first axis on the lower surface;
   a plurality of second carrying plates slidably carried by the at least one first mounting track on the first carrying plate, wherein each of the plurality of second carrying plates includes:
      at least one second mounting track extending along a second axis at least partially orthogonal to the first axis; and
      a plurality of extendable gripping components slidably carried by the at least one second mounting track;
   a first adjustment plate operably coupled to the plurality of second carrying plates to adjust a pitch of the plurality of second carrying plates in the first axis; and
   a plurality of second adjustment plates, each of the plurality of second adjustment plates carried by a corresponding second carrying plate and operably coupled to the plurality of extendable gripping components on the corresponding second carrying plate to adjust a pitch of the plurality of extendable gripping components in the second axis.

2. The object gripping assembly of example 1, further comprising an expandable component operably coupled to the first adjustment plate and the first carrying plate to adjust a position of the first adjustment plate with respect to the first carrying plate.

3. The object gripping assembly of example 2 wherein adjusting the position of the first adjustment plate with respect to the first carrying plate changes a pitch of the plurality of second carrying plates along the first axis.

4. The object gripping assembly of any of examples 1-3 wherein:
   each of the plurality of second carrying plates further include at least one vertical mounting track extending in a vertical axis at least partially orthogonal to both of the first axis and the second axis;
   each of the plurality of second adjustment plates is slidably carried by the at least one vertical mounting track on the corresponding second carrying plate; and
   the object gripping assembly further comprises a plurality of expandable components, each of the plurality of expandable components operably coupled to a corresponding second adjustment plate and the corresponding second carrying plate to adjust a position of the corresponding second adjustment plate with respect to the corresponding second carrying plate.

5. The object gripping assembly of example 4 wherein adjusting the position of the corresponding second adjustment plate with respect to the corresponding second carrying plate changes a pitch of the plurality of extendable gripping components along the second axis.

6. The object gripping assembly of any of examples 1-5 wherein each of the plurality of second carrying plates further includes a sliding stopper operable between an engaged position and a disengaged position, wherein, in the engaged position, the sliding stopper prevents movement of a corresponding second adjustment plate beyond a predetermined position.

7. The object gripping assembly of any of examples 1-6 wherein each of the plurality of extendable gripping components includes:
   an extendable assembly with a proximal end slidably carried by the at least one second mounting track and a distal end opposite the proximal end; and
   a gripping element carried by the distal end, wherein the extendable assembly is configured to extend and retract along a vertical axis at least partially orthogonal to both of the first axis and the second axis.

8. The object gripping assembly of any of examples 1-7 wherein each of the plurality of extendable gripping components is independently extendable.

9. The object gripping assembly of any of examples 1-8 wherein one or more of the plurality of extendable gripping components includes a distal end and a gripping element at the distal end, the gripping element including one or more of: a suction element, a vacuum port, a magnetic component, a pneumatic gripper, or a robotic gripper.

10. A method of operating an object gripping assembly having a plurality of gripping components that are independently operable, the method comprising:
    determining a set of the plurality of gripping components to operate during a gripping operation;
    determining a first desired pitch for the set of the plurality of gripping components along a first axis;
    determining a second desired pitch for the set of the plurality of gripping components along a second axis at least partially orthogonal to the first axis;
    generating commands for operating a first expandable component along a third axis at least partially orthogonal to both the first axis and the second axis, wherein operating the first expandable component adjusts a first actual pitch for at least a portion of the set of the plurality of gripping components along the first axis toward the first desired pitch; and
    generating commands for operating a second expandable component along the third axis, wherein operating the second expandable component adjusts a second actual pitch of the set of the plurality of gripping components along the first axis toward the first desired pitch.

11. The method of example 10 wherein each of the plurality of gripping components include an expandable body, and wherein the method further comprises, generating commands for extending the expandable body for each of the gripping components in the set of the plurality of gripping components.

12. The method of any of examples 10-11 wherein the gripping operation is a first gripping operation and the set of the plurality of gripping components is a first set, and wherein the method further comprises:
    determining a second set of the plurality of gripping components to operate during a second gripping operation;
    determining a third desired pitch for the second set of the plurality of gripping components along the first axis;
    determining a fourth desired pitch for the second set of the plurality of gripping components along the second axis;
    generating commands for further operating the first expandable component along the third axis, wherein further operating the first expandable component adjusts a third actual pitch for at least a portion of the second set of the plurality of gripping components along the first axis toward the third desired pitch; and generating commands for further operating the second expandable component along the third axis, wherein further operating the second expandable component adjusts a fourth actual pitch for the second set of the plurality of gripping components along the first axis toward the fourth desired pitch.

13. The method of example 12 determining the second set of the plurality of gripping components includes determining the second set of the plurality of gripping components that is different from those of the first set of the plurality of gripping components.

14. The method of any of examples 10-13, further comprising:

generating commands for lowering the set of the plurality of gripping components toward one or more objects to be moved;

generating commands for operating the set of the plurality of gripping components to attach to the one or more objects; and raising the set of the plurality of gripping components while attached to the one or more objects.

15. The method of any of examples 10-14, further comprising, generating commands for positioning a slidable stopper to prevent the first expandable component from expanding beyond a predetermined position before operating the first expandable component along the third axis.

16. A robotic system, comprising:

a robotic arm; and an object gripping assembly carried by the robotic arm, the object gripping assembly including:
  a first carrying plate with a first mounting track extending along a first axis;
  two or more second carrying plates movably carried by the first mounting track, wherein each of the two or more second carrying plates includes:
    a second mounting track extending along a second axis at least partially orthogonal to the first axis; and
    two or more extendable gripping components movably carried by the second mounting track on the second carrying plate;
  a first pitch adjusting component operably coupled to the first carrying plate and the two or more second carrying plates, the first pitch adjusting component configured to controllably change a first pitch between the two or more second carrying plates along the first mounting track;
  two or more second pitch adjusting components operably coupled to a corresponding second carrying plate and the two or more extendable gripping components carried by the second mounting track, each of the two or more second pitch adjusting components configured to controllably change a second pitch between the two or more extendable gripping components along the second mounting track.

17. The robotic system of example 16 wherein the first pitch adjusting component includes:

a pitch adjusting plate having two or more grooves operably coupled to the two or more second carrying plates, wherein the two or more grooves are oriented partially along the first axis, and wherein a position of the pitch adjusting plate with respect to the first carrying plate at least partially positions the two or more second carrying plates operably coupled to the two or more grooves; and an expandable component operably coupled to the first carrying plate and the pitch adjusting plate, wherein expansion and contraction of the expandable component changes the position of the pitch adjusting plate with respect to the first carrying plate.

18. The robotic system of any of examples 16-17 wherein each of the two or more second pitch adjusting components includes:

a pitch adjusting plate having two or more grooves operably coupled to the two or more extendable gripping components, wherein the two or more grooves are oriented partially along the second axis, and wherein a position of the pitch adjusting plate with respect to the corresponding second carrying plate at least partially positions the two or more extendable gripping components operably coupled to the two or more grooves; and an expandable component operably coupled to the corresponding second carrying plate and the pitch adjusting plate, wherein expansion and contraction of the expandable component changes the position of the pitch adjusting plate with respect to the corresponding second carrying plate.

19. The robotic system of any of examples 16-18 wherein each of the two or more extendable gripping components on each of the two or more second carrying plates is individually extendable.

20. The robotic system of any of examples 16-19 wherein each of the two or more extendable gripping components on each of the two or more second carrying plates includes at least one of a distal end and a gripping element at the distal end, the gripping element including one or more of: a suction element, a vacuum port, a magnetic component, a pneumatic gripper, or a robotic gripper.

21. The robotic system of any of examples 16-19, further comprising a processor operably coupled to the robotic arm and/or the object gripping assembly.

22. The robotic system of example 21, wherein the processor is configured to:

determine a set of the plurality of the two or more extendable gripping elements to operate during a gripping operation;

determine a desired pitch for the set of the two or more extendable gripping elements along the first axis; and operate the first pitch adjustment component to adjust an actual pitch for the set of the two or more extendable gripping elements toward the desired pitch.

23. The robotic system of any of examples 21 and 22, wherein the processor is configured to:

determine a set of the plurality of the two or more extendable gripping elements on each of the second carrying plates to operate during a gripping operation;

determine a desired pitch for the set of the two or more extendable gripping elements along the second axis; and operate the two or more second pitch adjustment components to adjust an actual pitch of the set of the two or more extendable gripping elements toward the desired pitch.

24. An object gripping assembly, comprising:

a first carrying plate with a first mounting track extending along a first axis;

two or more second carrying plates movably carried by the first mounting track, wherein each of the two or more second carrying plates includes:
   a second mounting track extending along a second axis at least partially orthogonal to the first axis; and
   a plurality of extendable gripping elements movably carried by the second mounting track on the second carrying plate;
a first pitch adjusting component operably coupled to the first carrying plate and the two or more second carrying plates, the first pitch adjusting component configured to controllably adjust a first pitch of the plurality of extendable gripping along the first axis;
a second pitch adjusting component operably coupled to a corresponding second carrying plate and the two or more extendable gripping elements carried by the second mounting track, the second pitch adjusting component configured to controllably adjust a second pitch of the plurality of extendable gripping elements along the second axis.

25. An object gripping assembly, comprising:
a first carrying plate;
a plurality of second carrying plates carried by the first plate, wherein each of the plurality of second carrying plates includes:
   a mounting track extending along a horizontal axis;
   a plurality of extendable gripping elements movably carried by the mounting track on the second carrying plate; and
a plurality of pitch adjusting components, each of the operably plurality of pitch adjusting components coupled to a corresponding second carrying plate and the two or more extendable gripping elements carried by corresponding second carrying plate, wherein each of the operably plurality of pitch adjusting components is configured to controllably adjust a pitch of the plurality of extendable gripping elements along the horizontal axis.

26. The object gripping assembly of example 25 wherein each of the operably plurality of pitch adjusting components includes:
   a pitch adjusting plate having a plurality of grooves operably individually coupled to the plurality of extendable gripping elements carried by corresponding second carrying plate, wherein a position of the pitch adjusting plate with respect to the corresponding second carrying plate at least partially positions the plurality of extendable gripping elements operably coupled to the plurality of more grooves; and
   an expandable component operably coupled to the corresponding second carrying plate and the pitch adjusting plate, wherein expansion and contraction of the expandable component changes the position of the pitch adjusting plate with respect to the corresponding second carrying plate.

27. The object gripping assembly of any of examples 25-26 wherein each of the plurality of extendable gripping elements on each of the plurality of second carrying plates is individually extendable.

28. The object gripping assembly of any of examples 25-27 wherein the first carrying plate includes a flange coupleable to a robotic positioning system, and wherein the flange includes one or more communication channels operably coupled to the plurality of pitch adjusting components.

29. The object gripping assembly of any of examples 25-28, further comprising a controller carried by the first mounting plate, wherein the controller is operable coupled to each of the plurality of extendable gripping elements and each of the plurality of pitch adjusting components.

CONCLUSION

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any material incorporated herein by reference conflicts with the present disclosure, the present disclosure controls. Where the context permits, singular or plural terms may also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments. Furthermore, although advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:
1. An object gripping assembly, comprising:
   a first carrying plate having:
      an upper surface, the upper surface including a flange configured to connect to a robotic arm; and
      a lower surface opposite the upper surface, the lower surface including at least one first mounting track extending along a first axis on the lower surface;
   a plurality of second carrying plates slidably carried by the at least one first mounting track on the first carrying plate, wherein each of the plurality of second carrying plates includes:
      at least one second mounting track extending along a second axis at least partially orthogonal to the first axis; and
      a plurality of extendable gripping components slidably carried by the at least one second mounting track, wherein each of the plurality of extendable gripping components includes:

an extendable body with a proximal end slidably carried by the at least one second mounting track and a distal end opposite the proximal end; and a gripping element carried by the distal end, wherein the extendable body is configured to extend and retract along a vertical axis at least partially orthogonal to both of the first axis and the second axis to adjust a position of the gripping element along the vertical axis;

a first pitch adjustment plate operably coupled to the plurality of second carrying plates to adjust a pitch of the plurality of second carrying plates along the first axis; and a plurality of second pitch adjustment plates, each of the plurality of second pitch adjustment plates carried by a corresponding second carrying plate and operably coupled to the plurality of extendable gripping components on the corresponding second carrying plate to adjust a pitch of the plurality of extendable gripping components along the second axis.

2. The object gripping assembly of claim 1, further comprising an expandable component operably coupled to the first pitch adjustment plate and the first carrying plate to adjust a position of the first pitch adjustment plate with respect to the first carrying plate.

3. The object gripping assembly of claim 2 wherein adjusting the position of the first pitch adjustment plate with respect to the first carrying plate changes a pitch of the plurality of second carrying plates along the first axis.

4. The object gripping assembly of claim 1 wherein:
each of the plurality of second carrying plates further include at least one vertical mounting track extending in a vertical axis at least partially orthogonal to both of the first axis and the second axis;
each of the plurality of second pitch adjustment plates is slidably carried by the at least one vertical mounting track on the corresponding second carrying plate; and
the object gripping assembly further comprises a plurality of expandable components, each of the plurality of expandable components operably coupled to a corresponding second pitch adjustment plate and the corresponding second carrying plate to adjust a position of the corresponding second pitch adjustment plate with respect to the corresponding second carrying plate.

5. The object gripping assembly of claim 4 wherein adjusting the position of the corresponding second pitch adjustment plate with respect to the corresponding second carrying plate changes the pitch of the plurality of extendable gripping components along the second axis.

6. The object gripping assembly of claim 1 wherein each of the plurality of second carrying plates further includes a sliding stopper operable between an engaged position and a disengaged position, wherein, in the engaged position, the sliding stopper prevents movement of a corresponding second pitch adjustment plate beyond a predetermined position.

7. The object gripping assembly of claim 1 wherein each of the plurality of extendable gripping components is independently extendable.

8. The object gripping assembly of claim 1 wherein the gripping element including one or more of: a suction element, a vacuum port, a magnetic component, a pneumatic gripper, or a robotic gripper.

9. A robotic system, comprising:
a robotic arm; and
an object gripping assembly attached to the robotic arm, the object gripping assembly including:

a first carrying plate with a first mounting track extending along a first axis;

two or more second carrying plates movably carried by the first mounting track, wherein each of the two or more second carrying plates includes:
a second mounting track extending along a second axis at least partially orthogonal to the first axis; and
two or more extendable gripping components movably carried by the second mounting track on the second carrying plate, wherein
each of the two or more extendable gripping components includes:
an extendable body with a proximal end slidably carried by the second mounting track and a distal end opposite the proximal end; and
a gripping element carried by the distal end, wherein the extendable body is configured to extend and retract along a vertical axis at least partially orthogonal to both of the first axis and the second axis to adjust a position of the gripping element along the vertical axis;

a first pitch adjusting component operably coupled to the first carrying plate and the two or more second carrying plates, the first pitch adjusting component configured to controllably change a first pitch between the two or more second carrying plates along the first mounting track; and two or more second pitch adjusting components operably coupled to a corresponding second carrying plate and the two or more extendable gripping components carried by the second mounting track, each of the two or more second pitch adjusting components configured to controllably change a second pitch between the two or more extendable gripping components along the second mounting track.

10. The robotic system of claim 9 wherein the first pitch adjusting component includes:
a pitch adjusting plate having two or more grooves operably coupled to the two or more second carrying plates, wherein the two or more grooves are oriented partially along the first axis, and wherein a position of the pitch adjusting plate with respect to the first carrying plate at least partially positions the two or more second carrying plates operably coupled to the two or more grooves; and
an expandable component operably coupled to the first carrying plate and the pitch adjusting plate, wherein expansion and contraction of the expandable component changes the position of the pitch adjusting plate with respect to the first carrying plate.

11. The robotic system of claim 9 wherein each of the two or more second pitch adjusting components includes:
a pitch adjusting plate having two or more grooves operably coupled to the two or more extendable gripping components, wherein the two or more grooves are oriented partially along the second axis, and wherein a position of the pitch adjusting plate with respect to the corresponding second carrying plate at least partially positions the two or more extendable gripping components operably coupled to the two or more grooves; and
an expandable component operably coupled to the corresponding second carrying plate and the pitch adjusting plate, wherein expansion and contraction of the expandable component changes the position of the pitch adjusting plate with respect to the corresponding second carrying plate.

12. The robotic system of claim 9 wherein each of the two or more extendable gripping components on each of the two or more second carrying plates is individually extendable.

13. The robotic system of claim 9 wherein the gripping element including one or more of: a suction element, a vacuum port, a magnetic component, a pneumatic gripper, or a robotic gripper.

\* \* \* \* \*